United States Patent
Georges, III

(10) Patent No.: US 10,466,649 B1
(45) Date of Patent: Nov. 5, 2019

(54) SYSTEMS AND METHODS FOR SIMULTANEOUS MULTI-CHANNEL OFF-AXIS HOLOGRAPHY

(71) Applicant: INTEGRITY APPLICATIONS INCORPORATED, Carlsbad, CA (US)

(72) Inventor: James A. Georges, III, Brighton, MI (US)

(73) Assignee: Centauri, LLC, Chantilly, VA (US)

( * ) Notice: Subject to any disclaimer, the term of this patent is extended or adjusted under 35 U.S.C. 154(b) by 67 days.

(21) Appl. No.: 15/796,338

(22) Filed: Oct. 27, 2017

Related U.S. Application Data

(63) Continuation-in-part of application No. 15/230,269, filed on Aug. 5, 2016.

(60) Provisional application No. 62/202,008, filed on Aug. 6, 2015.

(51) Int. Cl.
*G03H 1/04* (2006.01)
*G03H 1/16* (2006.01)

(52) U.S. Cl.
CPC ......... *G03H 1/0443* (2013.01); *G03H 1/0465* (2013.01); *G03H 1/16* (2013.01); *G03H 2001/045* (2013.01); *G03H 2001/0445* (2013.01); *G03H 2001/0452* (2013.01); *G03H 2001/0469* (2013.01); *G03H 2210/30* (2013.01)

(58) Field of Classification Search
CPC .............. H04N 5/23232; G06T 3/4053; G01B 9/02043; G01S 7/481; G01S 7/499; G01S 17/895
See application file for complete search history.

(56) References Cited

U.S. PATENT DOCUMENTS

| | | | |
|---|---|---|---|
| 7,355,716 B2 * | 4/2008 | de Boer | A61B 5/0059 356/479 |
| 8,913,149 B1 * | 12/2014 | Georges, III | H04N 5/23232 348/222.1 |
| 2006/0192972 A1 * | 8/2006 | Bingham | G01B 11/0675 356/458 |
| 2006/0238772 A1 | 10/2006 | Hanson et al. | |
| 2008/0094637 A1 * | 4/2008 | de Boer | A61B 5/0059 356/479 |
| 2009/0027686 A1 * | 1/2009 | Georges, III | G01B 9/02002 356/484 |

(Continued)

*Primary Examiner* — Neil R Mikeska
(74) *Attorney, Agent, or Firm* — Knobbe Martens Olson & Bear LLP

(57) ABSTRACT

Systems and methods for simultaneous multi-channel off-axis holography are described. Multi-channel imaging systems can include a light system including a plurality of light sources configured to generate illumination and reference beams at a plurality of wavelengths, an illumination system configured to illuminate a target object with the illumination beams, an optical assembly configured to receive a reflected target beam and condition the target beam for recording at an optical imaging system, and a reference system configured to propagate the reference beams to the optical imaging system. The reference beams are interfered with the target beam at the optical imaging system to create interference patterns, which can be recorded in a collective image having a plurality of side lobes. Holographic information in the side lobes can be combined to generate 3D images having a substantially reduced signal to noise ratio.

21 Claims, 13 Drawing Sheets

(56) References Cited

U.S. PATENT DOCUMENTS

| | | | |
|---|---|---|---|
| 2009/0219607 A1* | 9/2009 | Saggau | G02B 21/0016 359/305 |
| 2010/0002950 A1 | 1/2010 | Arieli et al. | |
| 2010/0008588 A1 | 1/2010 | Feldkhun et al. | |
| 2011/0300490 A1* | 12/2011 | Rachet | G02B 21/0032 430/322 |
| 2011/0304723 A1* | 12/2011 | Betzig | G02B 21/002 348/79 |
| 2012/0281236 A1* | 11/2012 | Kang | G01B 9/02044 356/479 |
| 2012/0294136 A1* | 11/2012 | Sato | G03H 1/0443 369/112.15 |
| 2012/0307035 A1 | 12/2012 | Yaqoob et al. | |
| 2013/0027711 A1* | 1/2013 | Hajian | G01J 3/0294 356/451 |
| 2013/0057935 A1* | 3/2013 | Joo | G03H 1/0866 359/10 |
| 2013/0088568 A1* | 4/2013 | Nolte | A61B 5/0075 348/40 |
| 2013/0120757 A1* | 5/2013 | Yu | A61B 3/102 356/479 |
| 2013/0301909 A1* | 11/2013 | Sato | G01B 11/25 382/154 |
| 2014/0153692 A1* | 6/2014 | Larkin | G06T 5/10 378/36 |
| 2014/0218684 A1* | 8/2014 | Kumar | A61B 3/102 351/206 |
| 2017/0089688 A1* | 3/2017 | Massow | G01B 9/02044 |
| 2017/0363415 A1* | 12/2017 | Frisken | G01B 9/02004 |

\* cited by examiner

SYSTEMS AND METHODS FOR SIMULTANEOUS MULTI-CHANNEL OFF-AXIS HOLOGRAPHY

CROSS REFERENCE TO RELATED APPLICATIONS

This application is a continuation-in part of U.S. application Ser. No. 15/230,269, filed Aug. 5, 2016, entitled Systems and Methods for Coherent Three-Dimensional Optical Ranging, which claims the benefit of U.S. Provisional Application No. 62/202,008, filed Aug. 6, 2015, entitled Coherent Three Dimensional Optical Ranging System. The disclosures of U.S. application Ser. No. 15/230,269 and U.S. Provisional Application No. 62/202,008 are considered part of this application, and are hereby incorporated by reference in their entirety.

GOVERNMENT RIGHTS

Government Rights: This invention was made with government support under Contract No. FA8650-10-D-5210/0030 awarded by the Air Force Research Laboratory. The government has certain rights in the invention.

TECHNICAL FIELD

This application generally relates to off-axis holography and, more specifically, to simultaneous multi-channel off-axis holographic systems and methods.

BACKGROUND

A need exists in many applications for improved digital holography systems and methods. For example, digital holography may be used to identify and assess surface defects or other characteristics in various types of equipment or other objects, as well as in other applications such as manufacturing, measurement, metrology, entertainment, and archiving. Holographic information can be more useful than two dimensional (2D) imagery that captures only intensity information, as various features of an imaged object may not be apparent in 2D images of the object.

SUMMARY

The systems, methods, and devices described herein have innovative aspects, no single one of which is indispensable or solely responsible for their desirable attributes. Without limiting the scope of the claims, the summary below describes some of the advantageous features. It will be appreciated that the embodiments described in the summary below represent specific embodiments of the multi-channel holographic systems and methods described herein, and are not intended to limit the scope of the present disclosure.

In one embodiment, a method for forming a collective image is described. The method comprises providing an illumination beam to an object to yield interaction light resulting from interaction between the illumination beam and the object, the illumination beam comprising coherent light at a plurality of wavelengths, directing at least some of the interaction light to an imaging sensor to form an image of the object on the imaging sensor, and interfering at least a portion of the interaction light with a plurality of reference beams simultaneously, thereby forming a plurality of interference patterns imaged on the image sensor. Each reference beam has a wavelength corresponding to one of the wavelengths. The interference patterns combine with the image of the object at the imaging sensor to form the collective image having a Fourier transform that includes a plurality of side lobes in Fourier space, each side lobe corresponding to one of the reference beams and having holographic information about a range of the object's spatial frequencies.

The collective image can further include a main lobe located centrally within the collective image. Each side lobe can be non-overlapping with the main lobe, the other side lobes, and complex conjugates of each side lobe. The collective image can include at least two side lobe pairs, each side lobe pair comprising a side lobe and a complex conjugate of the side lobe disposed opposite the side lobe about the center of the collective image. Each reference beam can interfere with the interaction light and not interfere with the other reference beams. The illumination beam can comprise a laser beam. Each reference beam can originate from a source that also generates a portion of the illumination beam. Directing at least some of the interaction light to the imaging sensor can include selectively blocking a portion of the interaction light at a pupil.

In another embodiment, an imaging system is described. The imaging system comprises a light system, an illumination system, an optical system, a reference system, an optical imaging system, and an imaging sensor. The light system has a plurality of light sources, each of the plurality of light sources configured to generate an illumination beam and a reference beam comprising coherent light of the same wavelength, and each of the plurality of light sources configured to generate the illumination and reference beams at a wavelength different than the wavelength of the other of the plurality of light sources. The illumination system is configured to receive the illumination beams from the light source and propagate the illumination beams from the light system to a light output device to illuminate an object with the illumination beams. The optical system comprises a pupil and is configured to receive a target beam of light reflected from the object and provide the target beam through the pupil to an optical imaging system. The reference system is configured to receive the reference beams from the light system and propagate the reference beams to the optical imaging system. The optical imaging system is configured to receive the reference beams from the optical system and the target beam and to combine the reference beams with the target beam to form a collective image representing the object, the collective image characterized as having a Fourier transform that includes a plurality of side lobes in Fourier space, each side lobe corresponding to one of the plurality of reference beams and having phase information about a range of the object's spatial frequencies. The image sensor is configured to capture the collective image of the object.

The optical imaging system can comprise at least one lens. The reference system can comprise one or more optical fibers configured to receive each reference beam and propagate each reference beam to the at least one lens along a path parallel to and displaced from the target beam. The collective image can be formed at an imaging plane, and the image sensor can be positioned at the imaging plane. The location of each side lobe within the Fourier plane can be determined by the displacement of the corresponding reference beam relative to the target beam. The imaging sensor can comprise a charge-coupled device. The imaging system can further comprise a non-transitory computer readable medium configured to allow storage of the collective image. The imaging system can further comprise one or more processors in communication with the non-transitory computer readable medium, the one or more processors configured to create a 3D high-dynamic-range image based at least in part on the phase information in the plurality of side lobes.

In another embodiment, a method of imaging is described. The method comprises exposing an object to a light source projecting coherent light at a plurality of wavelengths simultaneously, obtaining a plurality of complex images of the object, each of the plurality of complex images including amplitude information and phase information, at least two of the plurality of complex images obtained based on light detected at different wavelengths, wherein the phase information of each complex image has a corresponding dynamic range related to the wavelength of the complex image, and obtaining phase information from at least two complex images of the plurality of complex images. The method further comprises obtaining phase information corresponding to an equivalent wavelength in response to the phase information from the at least two complex images of the plurality of complex images, the phase information corresponding to the equivalent wavelength having a dynamic range that is greater than the dynamic ranges of the phase information of the at least two complex images, and creating an image based at least in part on the phase information corresponding to the equivalent wavelength of the plurality of complex images.

The creating can comprise removing noise from the phase information corresponding to a first equivalent wavelength image associated with the plurality of complex images to produce a de-noised image, wherein the noise is removed from the phase information corresponding to the first equivalent wavelength image based at least in part on phase information corresponding to a second equivalent wavelength image associated with the plurality of complex images, wherein the second equivalent wavelength is shorter than the first equivalent wavelength. The creating can comprise unwrapping the phase information corresponding to a second equivalent wavelength image associated with the plurality of complex images to produce an unwrapped image, wherein the phase information corresponding to the second equivalent wavelength image is unwrapped based at least in part on phase information corresponding to a first equivalent wavelength image associated with the plurality of complex images, wherein the second equivalent wavelength is shorter than the first equivalent wavelength. The plurality of complex images can be obtained based on images captured simultaneously by an imaging sensor, each of the complex images comprising a side lobe in Fourier space. Each of the side lobes can be non-overlapping with side lobes of the other images within the collective image.

DETAILED DESCRIPTION

Figure 1:
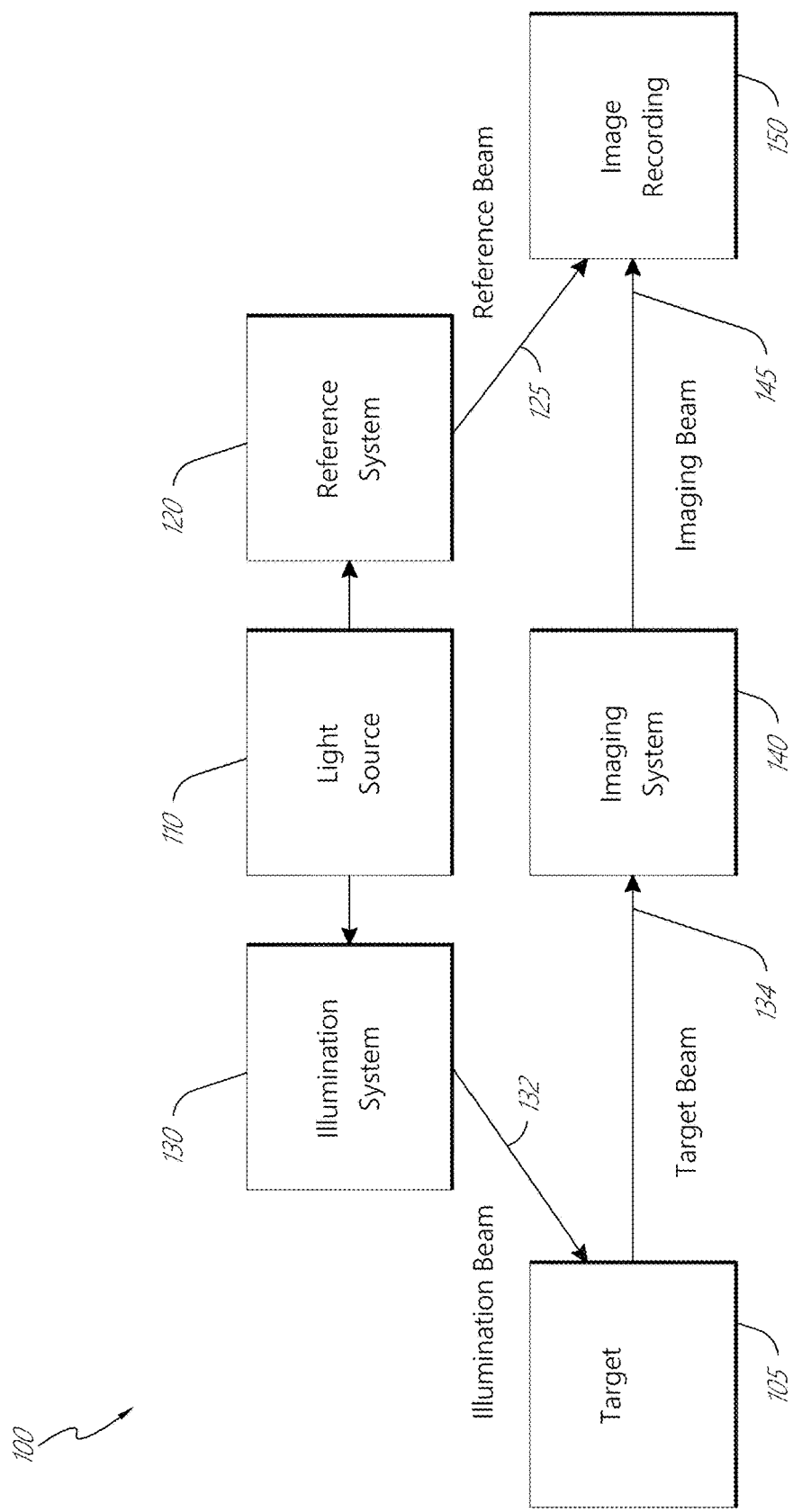
FIG. 1 schematically illustrates an example single-channel system for recording a collective image of a target.

Throughout the specification, multi-channel holographic systems and methods are described with reference to high-dynamic-range 3D imaging applications. 3D imaging applications are a specific embodiment of multi-channel holography, and it will be appreciated that the techniques described herein can equally be applied to other holographic applications. For example, a multi-channel system in which channels are orthogonally polarized may be used to simultaneously obtain holographic information regarding unique polarizations, such that polarization effects of target surfaces can be studied. In addition, multiple polarization channels may be able to reduce observed speckle effects of existing holographic imaging systems. Moreover, the 3D imaging techniques described herein may be combined with known synthetic aperture imaging techniques to achieve further enhanced signal to noise ratio.

In further example implementations, the multiple illumination and reference channels described herein may be produced with differing temporal and/or spatial coherence characteristics to produce multiple sets of holographic information for the same object with different temporal and/or spatial coherence information in each set. Accordingly, optical coherence tomography collection can be enhanced using the multi-channel techniques described herein.

Geometric information may exist at the scale of an optical wavelength. For example, holographic information obtained using a coherent light source (e.g., a 633 nm red laser) can provide depth information relative to the wavelength of the light. For example, a geometric feature with a depth of 1 inch would be equivalent to more than 40,000 wavelengths deep. Measurement of geometric features in terms of small wavelengths, by comparing the phase of light reflected by the geometric feature to a reference beam of the same wavelength, can thus provide high accuracy. However, in this method, the depth information is wrapped modulo $2\pi$, or spatially, modulo one wavelength. More specifically, although the phase difference between an imaging beam and a reference beam may be measured accurately, the actual depth z of a point of measurement is defined by $z=\lambda(\phi/2\pi)+n\lambda$, where $\lambda$ is the wavelength, $\phi$ is the measured phase difference, and n is an unknown integer. Thus, when the depth variation in a geometric feature is significantly greater than the wavelength of light, multiple depths (e.g., depths separated by integer multiples of the wavelength) would result in the same phase difference and be indistinguishable from one another. Thus, holographic information taken at shorter wavelengths can offer precise depth information, but can be difficult or impossible to use without longer wavelength holographic information indicative of larger geometric surface features.

Multiple-wavelength holography can be used to provide larger scale holographic information. Multiple-wavelength holography is typically achieved by illuminating and imaging a target object with different wavelengths of light in a time-sequenced fashion. However, there exists a need for reliable multiple-wavelength holography outside of carefully controlled, stationary environments. In such implementations, camera movement (e.g., due to movement of a user's hand), contamination, thermal growth, atmospheric change, or other error sources occurring between two or more time-sequenced single-wavelength holographic images can prevent the images from being combined to enhance the holographic information contained therein. Accordingly, a system capable of simultaneously obtaining holographic information at multiple wavelengths can provide significant advantages over existing holographic systems. Certain embodiments of the present disclosure may use a plurality of complex images (e.g., images containing both amplitude and phase information) taken at a plurality of coherent wavelengths to generate depth information accurate to relatively short length scales, but with less wrapping (e.g., consistent with longer length scales).

In some implementations, there can be a need to identify and assess surface defects on many types of equipment. For example, organizations that operate equipment may have a maintenance objective which involves assessing surface defects over the equipment. Certain embodiments can provide an inspection process and/or system that utilizes an active laser illumination system that emits one or more coherent wavelengths of light and a camera which captures complex interferometric information, and is configured to determine three-dimensional (3D) surface structure information for defect analysis.

Certain embodiments of the present disclosure may employ a hardware and measurement approach to identify geometric features. Some embodiments include a 3D high-dynamic-range optical imaging system.

A method of 3D high-dynamic-range imaging may include exposing an object to a light source projecting light at a plurality of coherent wavelengths, obtaining a plurality of single-wavelength complex images of the object with each complex image comprising amplitude information and phase information, and obtained based on light detected at different wavelengths, building equivalent-wavelength complex images based on combinations of the complex images and comprising phase information corresponding to an equivalent wavelength related to the wavelengths of the single-wavelength complex images, and unwrapping each equivalent-wavelength image. The unwrapping of at least one equivalent-wavelength complex image can be based, at least in part, on the phase information of one or more other complex images of the plurality of complex images, to produce a plurality of unwrapped images. Unwrapping at least one equivalent-wavelength complex image of the plurality of complex images may be based, at least in part, on information obtained from unwrapping one or more other complex images of the plurality of complex images.

In some embodiments, image data is collected in a "snapshot" of a target area such that the image data for multiple wavelengths is acquired at one time, that is, at a single time or during a short period of time (e.g., less than a second) such that acquiring the image data for each wavelength is performed simultaneously or nearly simultaneously with one another. The image data can include illuminating a structure with a plurality of wavelengths (e.g., 2, 3, 4, or more) of coherent light and collecting reflected light. By using multiple wavelengths of light of the same area, accurate depth information or other holographic information can be obtained using certain embodiments described herein. Capturing the depth information for multiple wavelengths based on images obtained simultaneously may further reduce or eliminate noise and/or errors that may occur due to laser drift, vibration, relative motion between the image acquisition device and the object to be imaged, or other error sources related to time multiplexing.

Before describing simultaneous multi-channel holographic systems, a single-channel off-axis holography system will be described. FIG. 1 schematically illustrates an example single-channel system 100 for recording a composite image of a target 105. The system 100 includes a light source 110 which emits light to a reference system 120 and an illumination system 130. The illumination system 130 is configured to produce an illumination beam 132 incident upon the target 105. An imaging system 140 receives a reflected target beam 134 from the target 105 and sends an imaging beam 145 to an image recording system 150. The reference system 120 is configured to send a reference beam 125 to the image recording system 150.

The light source 110 can be any suitable source capable of producing light at a desired wavelength. The light comprises a coherent beam of light. For example, the light source 110 can be a laser source configured to output a coherent beam of light at a selected wavelength. In some aspects, the light source 110 may produce a single beam of light, which can be split such that a first portion of the beam is sent to the reference system 120 and a second portion of the beam is sent to the illumination system 130. Alternatively, one or more light sources 110 may separately produce a first beam directed to the reference system 120 and a second beam directed to the illumination system 130, with the first beam and the second beam in a phase relationship with one another (e.g., the first beam and the second beam are in phase with one another). The light can propagate from the light source to the reference system 120 through one or more single-mode optical fibers and the light can propagate from the light source to the illumination system 130 through one or more single mode optical fibers. In certain embodiments, light can propagate from the light source to the reference system 120 and/or illumination system 130 through free space propagation, fibers, and/or other optic or photonic structures, in addition to or instead of single-mode optical fibers.

The reference system 120 is configured to direct a reference beam 125 to the image recording system 150. The reference system 120 can include any number of optical elements, for example, one or more reflective, refractive, and/or diffractive optical elements. The reference system 120 can include one or more single-mode optical fibers having a first end disposed to receive coherent light produced by the light source 110 and a second end disposed to output the coherent light as a reference beam 125 directed toward the image recording system 150. The reference beam 125 can be directed to pass through at least a portion of the imaging system 140, for example a lens or other optical element.

The illumination system 130 is configured to direct an illumination beam 132 to the target 105. The illumination system 130 can include any number of optical elements, for example, one or more reflective, refractive, and/or diffractive optical elements. The illumination system 130 can include one or more single-mode optical fibers having a first end disposed to receive coherent light produced by the light source 110 and a second end disposed to output the coherent light as an illumination beam 132 directed toward the target 105. The illumination beam 132 is incident upon the surface of the target 105. At least a portion of the illumination beam 132 is reflected by the surface of the target 105 to form a target beam 134 directed toward the imaging system 140. The shape, texture, or other characteristics of the surface of the target 105 can cause the light from the illumination beam 132 to be scattered in various directions. At least a portion of the scattered light can be directed to propagate to the imaging system 140. The target beam 134 comprises the portion of the scattered light propagating to the imaging system 140. The target 105 can be transmissive, rather than reflective, or can be a combination of transmissive and reflective. Where at least a portion of the target 105 is transmissive, the target beam 134 can be partially or entirely transmitted through the target 105 rather than reflected from the target 105.

The imaging system 140 is configured to receive the target beam 134 and to produce an imaging beam 145 directed toward the image recording system 150. Generally described, the imaging system 140 focuses or otherwise processes the light received in the target beam 134 to produce an imaging beam 145 suitable for recording at the image recording system 150. For example, the imaging system 140 can be configured to focus the imaging beam 145 at a desired imaging plane, for example, at the location of a light recording device of the image recording system 150. Accordingly, the imaging system 140 can include one or more reflective, refractive, and/or diffractive optical elements, such as one or more lenses, pupils, apertures, mirrors, filters, or the like. The imaging system 140 can further be configured to affect the reference beam 125. For example, the imaging system 140 may include a lens or system of lenses through which the reference beam 125 travels. Upon entering the lens or system of lenses, the target beam 134 is altered to form the imaging beam 145. The imaging system 140 can further be configured to cause the imaging beam 145 to interfere with the reference beam 125 at the image recording system 150 so as to produce one or more interference patterns indicative of depth information related to the surface of the target 105. In certain embodiments, the system 100 can be configured such that the reference beam 125 and the imaging beam 145 are combined and imaged in an image-space plane, a pupil-space plane, or an intermediate plane.

The image recording system 150 includes a recording device such as a digital imaging sensor configured to receive and record an image resulting from interference between the imaging beam 145 and the reference beam 125. The image resulting from the interference between the imaging beam 145 and the reference beam 125 is an intensity image including an interference pattern. Complex image information including amplitude information and phase information can be decoded from the imaged interference pattern based at least in part on the known wavelength(s) of imaged light. The imaging sensor can be a charge-coupled device (CCD), complementary metal-oxide-semiconductor (CMOS) sensor, N-type metal-oxide semiconductor (NMOS) sensor, or the like. The image recording system 150 can include one or more memory components configured to store images obtained at the imaging sensor. The imaging system 150 can further include one or more processors configured to perform image processing operations such as generating one or more 3D images based on the images obtained at the imaging sensor.

Figure 2:
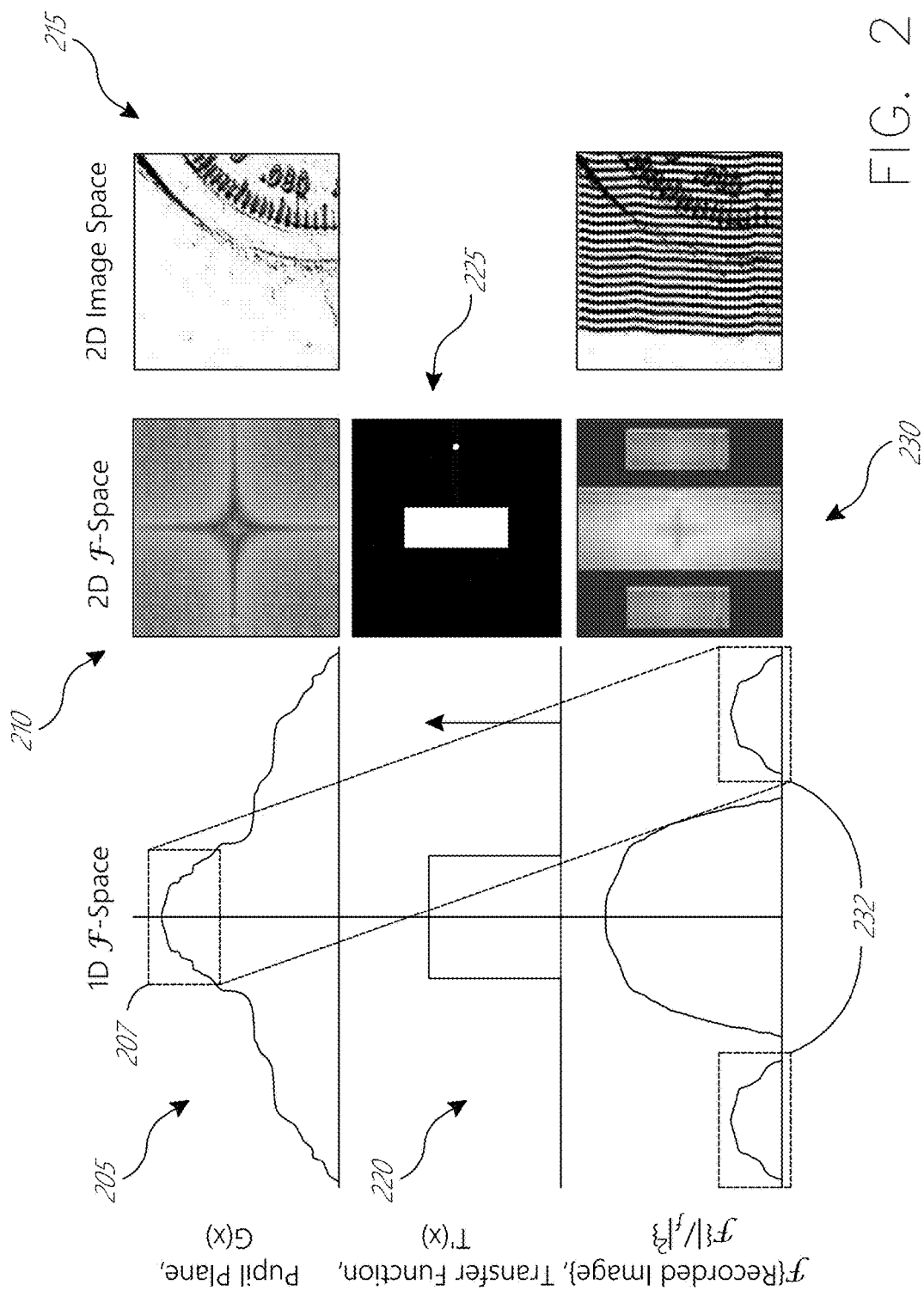
FIG. 2 depicts one-dimensional and two-dimensional Fourier representations of an example object and image resulting therefrom and having phase information.

FIG. 2 depicts examples of one-dimensional and two-dimensional Fourier representations of an object, and images resulting therefrom. The representations shown in FIG. 2 can be obtained in an example system similar to the system of FIG. 1, in which the imaging system 140 includes a rectangular pupil. As will be described in greater detail below, the recorded image shown in the bottom row in FIG. 2 contains phase information that may be used for three-dimensional imaging.

The top row in FIG. 2 shows examples of one and two dimensional Fourier transforms of an object. A Fourier transform of the object can be modeled to be at the pupil plane of the system 100. Images 205 and 210 are representations of the example object in 1D and 2D Fourier space (frequency domain), respectively. Image 215 is a representation of the example object in 2D image space (spatial domain). The 2D Fourier space representation 210 in the top row is a Fourier representation of an intensity-only image obtained by the imaging sensor. Accordingly, this image does not contain phase information.

The middle row in FIG. 2 shows an example transfer function of the system 100. As shown in the respective 1D and 2D Fourier space representations 220, 225 of the transfer function, the transfer function corresponds to a rectangular aperture centered on the optical axis and a δ-function displaced from the optical axis. In these examples, the central aperture corresponds to a rectangular physical aperture, for example, as a part of the imaging system 140. The δ-function corresponds, for example, to a coherent homodyne beam (e.g., a plane wave arriving at an angle with respect to the imaging axis).

The bottom row in FIG. 2 shows a recorded complex image including phase information. The complex image 230 in the bottom row includes a center lobe and side lobes created by the interference of the homodyne beam with the imaging beam. In the example shown, the side lobes are depicted as providing information, including phase information, about the example object's lower spatial frequencies 232 corresponding to the central portion 207 in example depiction 205. In some embodiments, the spatial orientation between the example object and the imaging system 140 can be adjusted so as to obtain information, including phase information, about the object's higher spatial frequencies.

Figure 3:
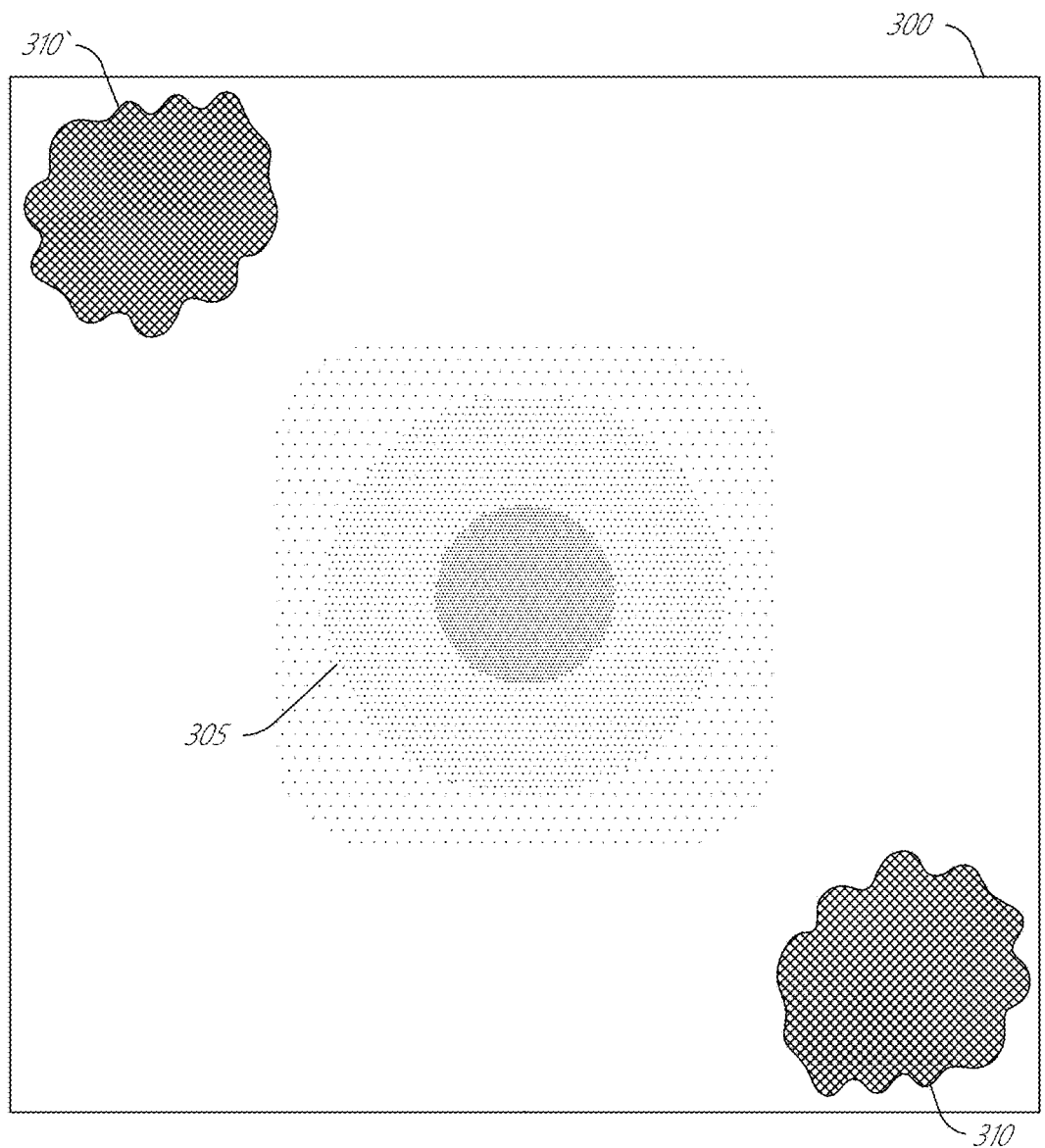
FIG. 3 depicts an example two-dimensional image in Fourier space including a main lobe and a single side lobe pair.

FIG. 3 depicts another example of a two-dimensional image 300 in Fourier space. The two-dimensional image 300 in Fourier space includes a main lobe 305 and a single side lobe pair, specifically side lobes 310 and 310'. The image 300 can be obtained by systems and methods similar to those described above with reference to FIGS. 1 and 2. As described above with reference to FIG. 2, the side lobes 310, 310' include both amplitude information and phase information. Side lobe 310 and side lobe 310' are complex conjugates of each other, and thus include substantially the same phase information. An image such as image 300 generated by a single-channel system 100 generally includes a single side-lobe pair because in this example a single homodyne beam is used for interference with the imaging beam. The location of the side lobes 310, 310' is dependent on the angle of the reference beam 125 relative to the imaging beam 145 as schematically depicted in FIG. 1. Given the system configuration schematically depicted in FIG. 1, the two side lobes 310, 310' of a side lobe pair will generally disposed in opposite positions about the center of the main lobe 305.

Figure 4:
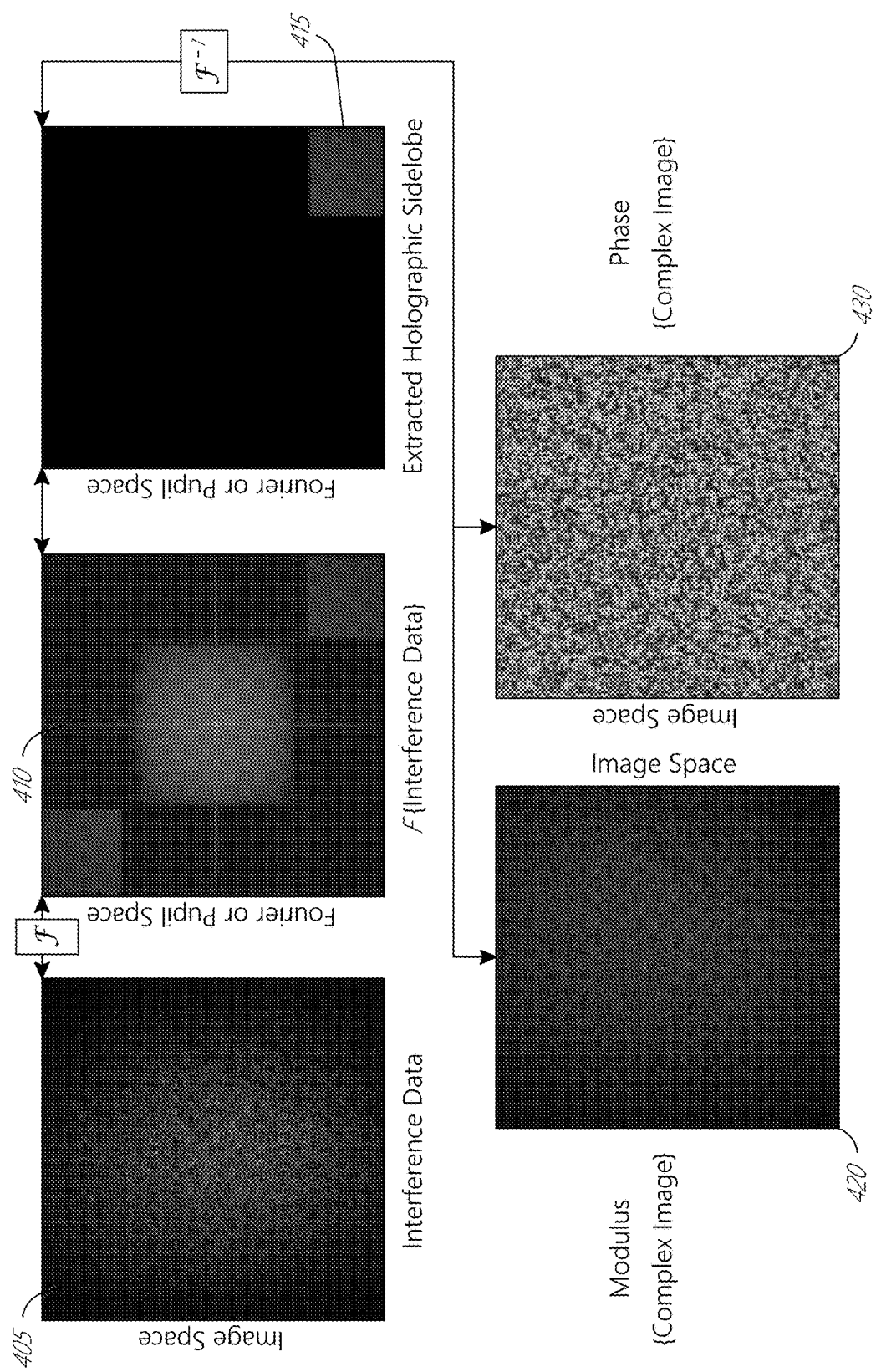
FIG. 4 depicts an example process of extracting holographic data in a single-channel off-axis spatial holographic system.

FIG. 4 depicts an example process of extracting holographic data in a single-channel off-axis spatial holographic system. As shown in the decoding process of FIG. 4, an intensity image 405 includes interference data due to the interference of a reference beam with an imaging beam. A Fourier transform results in a Fourier-space image 410 including a pair of side lobes similar to the image 300 of FIG. 3. The side lobes can be extracted to obtain a holographic side lobe 415 which contains holographic information about the imaged object. In some embodiments, the holographic side lobe 415 can be isolated by cropping the 2D Fourier space image 410 (e.g., by masking, chipping, stamping, or the like) to retain only the information in one of the side lobes and ignoring or excluding the remainder of the image. Finally, the Fourier space side lobe 415 can be transformed to a 2D image plane representation using an inverse Fourier transform. Because the side lobe 415 in Fourier space included intensity and phase information, the 2D image plane representation of the side lobe is a complex image including modulus information 420 and phase information 430.

Figure 5:
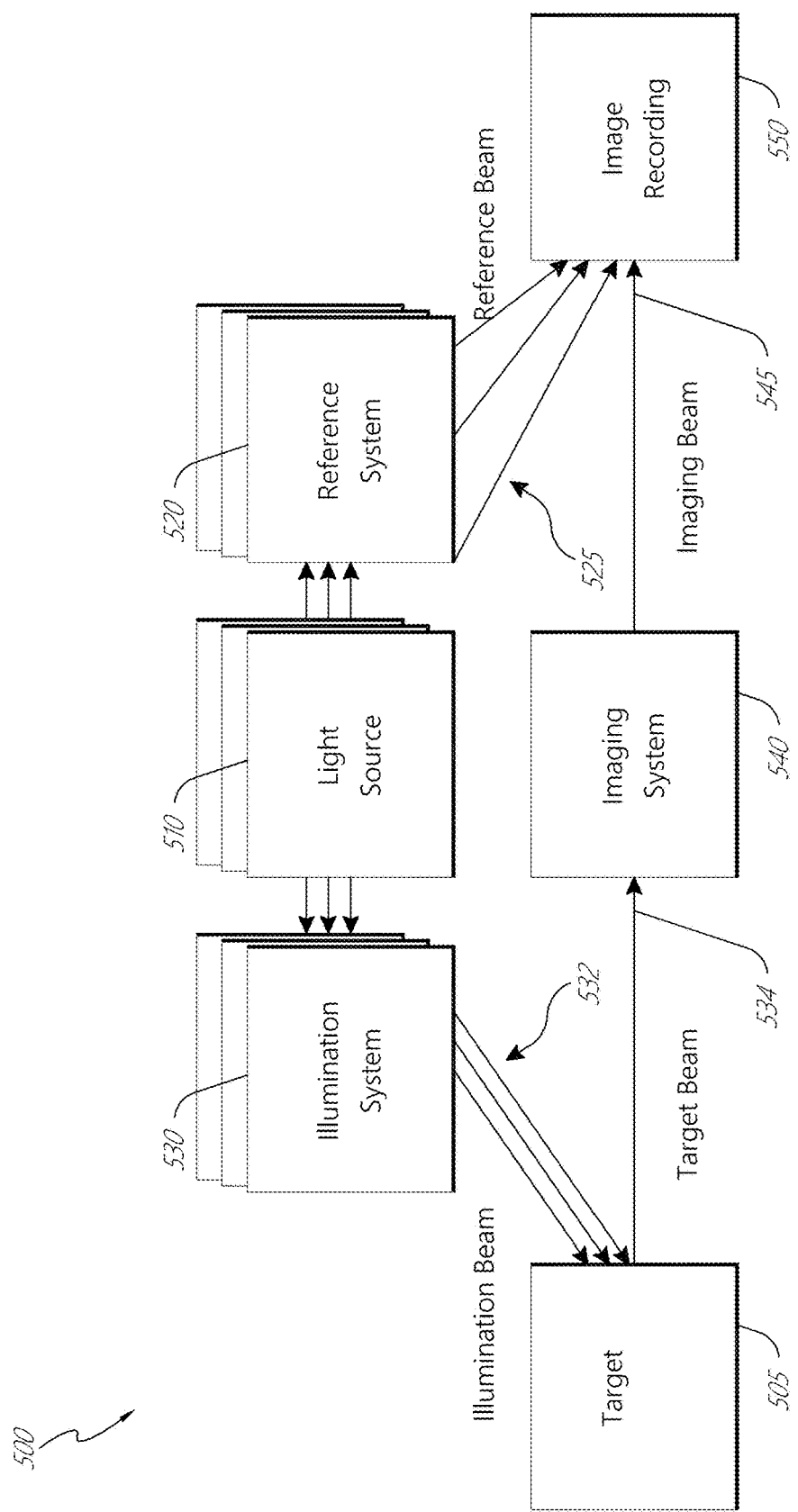
FIG. 5 schematically illustrates an example multi-channel system for recording a collective image of a target.

With this understanding of a single-channel configuration, systems and methods for simultaneous multi-channel off-axis holography will now be described. FIG. 5 schematically illustrates an example of a multi-channel system 500 for recording a composite image of a target 505 in accordance with certain embodiments described herein. The multi-channel system 500 contains similar elements to the single-channel system 100 depicted in FIG. 1. However, the multi-channel system 500 includes a plurality of light sources 510, reference systems 520, and illumination systems 530. Each light source of the plurality of light sources 510 is configured to produce coherent light at a wavelength different from some or all of the other light sources of the plurality of light source 510. Each light source of the plurality of light sources 510 emits light to a corresponding illumination system of the plurality of illumination systems 530 and a corresponding reference system of the plurality of reference systems 520. The multi-channel system 500 can include two or more channels, for example, 2, 3, 4, or more channels, depending on the number of wavelengths desired for composite imaging. For example, a 4-channel system may include 4 light sources 510, 4 reference systems 520, and 4 illumination systems 530.

In various embodiments, the light sources 510 can be any suitable sources capable of producing light at desired wavelengths. In some embodiments, the light sources 510 comprise laser sources configured to produce coherent beams of light at different wavelengths. In some aspects, each light source of the plurality of light sources 510 may produce a single beam of light, which can be split such that a first portion of the beam is sent to the corresponding reference system of the plurality of reference systems 520 and a second portion of the beam is sent to the corresponding illumination system of the plurality of illumination systems 530. Alternatively, each light source 510 may separately produce a first beam directed to the corresponding reference system and a second beam directed to the corresponding illumination system, with the first beam and the second beam in a phase relationship with one another (e.g., the first beam and the second beam are in phase with one another). Each of the light sources 510 can comprise a single source configured to act as multiple sources, multiple discrete sources, or a combination thereof. In some embodiments, light propagates from the light sources to the reference systems through one or more single-mode optical fibers, and light propagates from the light sources to the illumination systems 530 through one or more single-mode optical fibers. In certain embodiments, light can propagate from the light sources to the illumination systems 530 through free space propagation, fibers, and/or other optic or photonic structures, in addition to or instead of single-mode optical fibers.

The reference systems 520 are configured to direct a plurality of reference beams 525 to the image recording system 550. Each of the reference systems 520 can include one or more optical elements, for example, one or more reflective, refractive, and/or diffractive optical elements. In some embodiments, each of the reference systems 520 includes one or more single-mode optical fibers having a first end disposed to receive coherent light produced by the corresponding light source and a second end disposed to output the coherent light as one of the reference beams 525 directed toward the image recording system 550. In some aspects, the reference beams 525 can be directed to pass through at least a portion of the imaging system 540, for example a lens or other optical element.

The illumination systems 530 are configured to direct a plurality of illumination beams 532 to the target 505. Each of the illumination systems 530 can include one or more optical elements, for example, one or more reflective, refractive, and/or diffractive optical elements. In some embodiments, each of the illumination systems 530 include one or more single-mode optical fibers having a first end disposed to receive coherent light produced by the corresponding light source and a second end disposed to output the coherent light as one of the illumination beams 532 directed toward the target 505. The illumination beams 532 are incident upon the surface of the target 505. At least a portion of the illumination beams 532 is reflected by the surface of the target 505 to form a target beam 534 directed toward the imaging system 540. It will be appreciated that the shape, texture, or other characteristics of the surface of the target 505 may cause the light from the illumination beams 532 to be scattered in various directions. At least a portion of the scattered light may be directed to propagate to the imaging system 540. The target beam 534 comprises the portion of the scattered light propagating to the imaging system 540.

The imaging system 540 is configured to receive the target beam 534 and to produce an imaging beam 545 directed toward the image recording system 550. Generally described, the imaging system 540 focuses or otherwise processes the light received in the target beam 534 to produce an imaging beam 545 suitable for recording at the image recording system 550. For example, the imaging system 540 can be configured to focus the imaging beam 545 at a desired imaging plane, for example, at the location of a light recording device of the image recording system 550. Accordingly, the imaging system 540 can include one or more reflective, refractive, and/or diffractive optical elements, such as one or more lenses, pupils, apertures, mirrors, filters, or the like. In some embodiments, the imaging system 540 can further be configured to affect the reference beams 525. For example, the imaging system 540 may include a lens or system of lenses through which the reference beams 525 travel. The target beam 534 enters the lens or system of lenses and is altered to form the imaging beam 545. The imaging system 540 can further be configured to cause the imaging beam 545 to interfere with the reference beams 525 at the image recording system 550 so as to produce one or more interference patterns indicative of depth information related to the surface of the target 505. In certain embodiments, the system 500 can be configured such that the reference beams 525 and the imaging beam 545 are combined and imaged in an image-space plane, a pupil-space plane, or an intermediate plane.

The image recording system 550 includes a recording device such as one or more digital imaging sensors, each having a plurality of sensing elements, configured to receive and record the combination (e.g., superposition) of the imaging beam 545 and the reference beams 525. For example, in various embodiments the imaging sensor of the image recording system 550 can be a charge-coupled device (CCD), complementary metal-oxide-semiconductor (CMOS) sensor, N-type metal-oxide semiconductor (NMOS) sensor, or the like. The image recording system 550 can include one or more memory components configured to store images obtained at the imaging sensor. The imaging system 550 can further include one or more processors configured to perform image processing operations such as generating one or more 3D images based on the images obtained at the imaging sensor.

The multi-channel system of FIG. 5 may be constructed such that there is no coherence or interference between channels (e.g., different wavelengths) of light at either the image recording system 550 or target 505. To achieve a lack of coherence or interference between the channels, the various light sources 510 can be configured to output light having different polarization (e.g., orthogonal polarization), wavelength, temporal coherence, spatial coherence, or other characteristic. Moreover, the multi-channel system of FIG. 5 can be further extended to produce additional beams, such as by splitting the light from the light sources 510 multiple times. For example, the light from light sources 510 can first be split to produce reference beams 525 and illumination beams 532, which can further be split by additional beam splitters to produce homodyne reference and illumination beams for multiple imaging systems.

Figure 6:
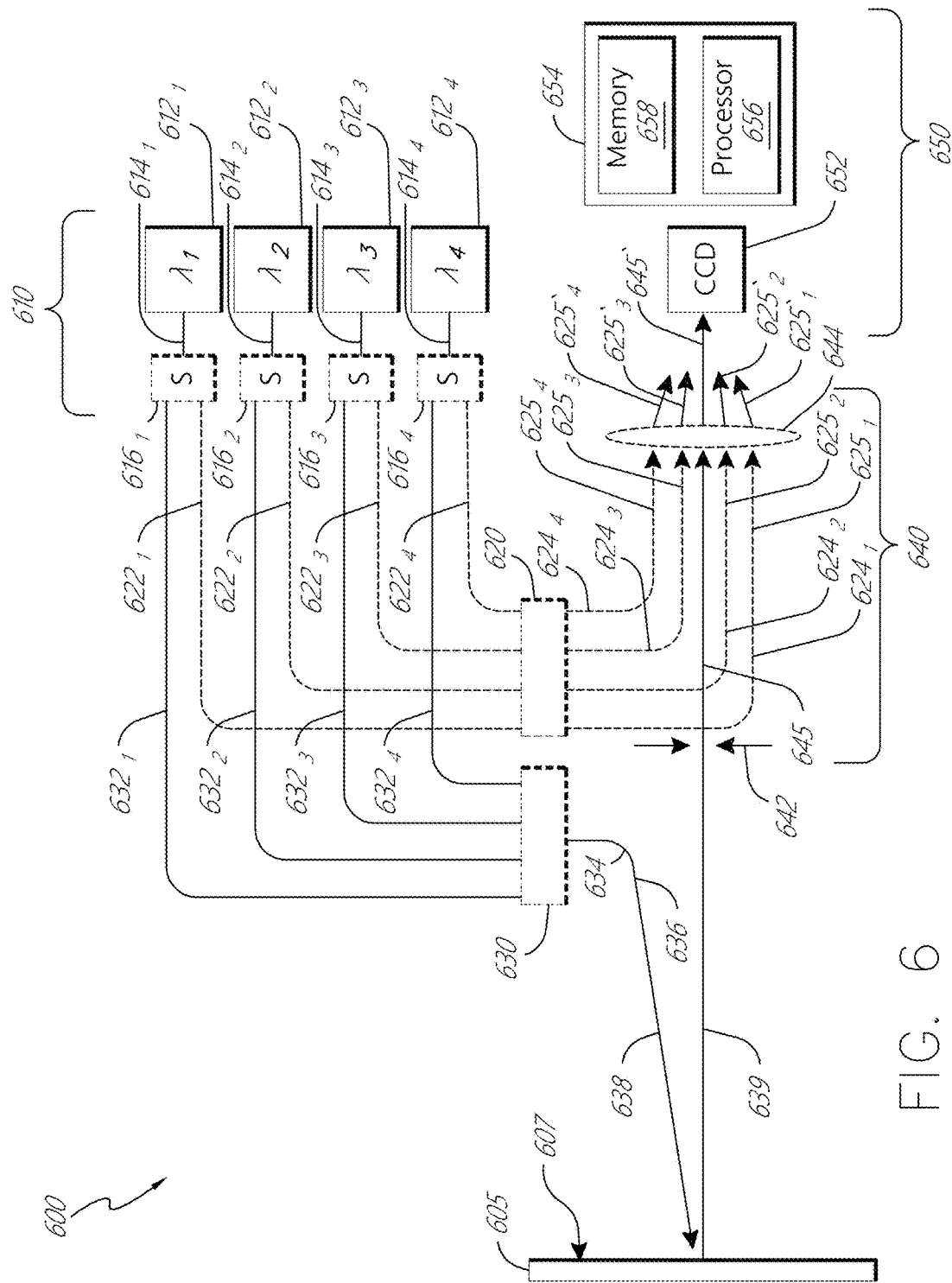
FIG. 6 depicts an example configuration of the multi-channel system of FIG. 5.

FIG. 6 depicts an example embodiment of a multi-channel system 600 in accordance with the example multi-channel system 500 of FIG. 5. The example multi-channel system 600 in FIG. 6 may have certain aspects that are similar to, or the same as, the multi-channel system 500, and aspects described with reference to FIG. 6 can be applicable to embodiments of the multi-channel system 500. However, the embodiments depicted in FIG. 6 and described below are particular embodiments that do not limit the scope of embodiments described above with reference to FIG. 5. The multi-channel system 600 can include a light system 610, a reference system 620, an illumination system 630, an optical imaging system 640, and an image recording system 650. The multi-channel system 600 is configured to generate complex images of at least a portion of the surface 607 of a target object 605. Although the multi-channel system 600 is depicted and described with four channels, each corresponding to one wavelength of illumination and reference light, it will be appreciated that the system may readily be implemented with more or fewer than four channels (e.g., 2, 3, 4, 5, 6, or more channels) by including an appropriate number and configuration of light sources, splitters, fibers, and other associated components of the system 600.

The light system 610 includes a plurality of light sources 612$_1$, 612$_2$, 612$_3$, 612$_4$ and beam splitters 616$_1$, 616$_2$, 616$_3$, 616$_4$. Each light source 612$_1$, 612$_2$, 612$_3$, 612$_4$ can be a laser source configured to output a coherent beam of light through a corresponding single-mode fiber 614$_1$, 614$_2$, 614$_3$, 614$_4$. Each light source 612$_1$, 612$_2$, 612$_3$, 612$_4$ produces its coherent beam at a corresponding wavelength (e.g., light source 612$_1$ produces light at a wavelength light source 612$_2$ produces light at a wavelength $\lambda_2$, etc.). Each of the single-mode fibers 614$_1$, 614$_2$, 614$_3$, 614$_4$ direct the light from the corresponding one of the light sources 612$_1$, 612$_2$, 612$_3$, 612$_4$ to the corresponding one of the beam splitters 616$_1$, 616$_2$, 616$_3$, 616$_4$. The beam splitters 616$_1$, 616$_2$, 616$_3$, 616$_4$ are configured to split the incoming light into two portions.

A reference portion of the incoming light from each of the fibers 614$_1$, 614$_2$, 614$_3$, 614$_4$ is coupled into reference system input fibers 622$_1$, 622$_2$, 622$_3$, 622$_4$, and an illumination portion of the incoming light is coupled into illumination system input fibers 632$_1$, 632$_2$, 632$_3$, 632$_4$.

The reference system 620 can comprise the reference system input fibers 622$_1$, 622$_2$, 622$_3$, 622$_4$, and can comprise reference system output fibers 624$_1$, 624$_2$, 624$_3$, 624$_4$, as schematically illustrated in FIG. 6. The reference system 620 receives the reference portions of the light from the light system 610 through the reference system input fibers 622$_1$, 622$_2$, 622$_3$, 622$_4$. The reference system 620 is configured to condition and aim the reference portions of the light to form discrete off-axis reference beams 625$_1$, 625$_2$, 625$_3$, 625$_4$. The reference system 620 is configured to direct the light from the reference system input fibers 622$_1$, 622$_2$, 622$_3$, 622$_4$ through the reference system output fibers 624$_1$, 624$_2$, 624$_3$, 624$_4$. After traveling through the reference system output fibers 624$_1$, 624$_2$, 624$_3$, 624$_4$, the light exits as reference beams 625$_1$, 625$_2$, 625$_3$, 625$_4$ directed toward the optical imaging system 640 and/or the image recording system 650. In some embodiments, the reference system input fibers 622$_1$, 622$_2$, 622$_3$, 622$_4$ and the reference system output fibers 624$_1$, 624$_2$, 624$_3$, 624$_4$ can comprise opposing ends of contiguous single-mode optical fibers with no intervening optical elements. In other embodiments, the reference system 620 can further comprise one or more additional optical elements, such as reflective, refractive, and/or diffractive optical elements disposed between the reference system input fibers 622$_1$, 622$_2$, 622$_3$, 622$_4$ and the reference system output fibers 624$_1$, 624$_2$, 624$_3$, 624$_4$ to affect the direction, intensity, collimation, or otherwise condition the reference beams 625$_1$, 625$_2$, 625$_3$, 625$_4$. An example reference system 620 compatible with certain embodiments described herein is described in greater detail with reference to FIG. 7.

The illumination system 630 can comprise the illumination system input fibers 632$_1$, 632$_2$, 632$_3$, 632$_4$, and can comprise an illumination system output 634, as schematically illustrated in FIG. 6. The illumination system 630 receives the illumination portion of the light from the light system 610 through the illumination system input fibers 632$_1$, 632$_2$, 632$_3$, 632$_4$. The illumination system 630 is configured to condition and aim the illumination portions of the light as an illumination beam 638 to illuminate the surface 607 of the target object 605. The illumination system 630 couples the light from the illumination system input fibers 632$_1$, 632$_2$, 632$_3$, 632$_4$ into the illumination system output 634. The illumination system output 634 can comprise a single optical fiber, a bundle of single-mode fibers, or other waveguide structure. Light for illuminating the surface 607 of the target object 605 leaves the output end 636 of the illumination system output 634 as an illumination beam 638 directed toward the target object 605. The illumination beam 638 can comprise a single beam including light of wavelengths $\lambda_1$, $\lambda_2$, $\lambda_3$, and $\lambda_4$, or can comprise a plurality of separate beams in close proximity to one another. For example, if the illumination system output 634 comprises a bundle of separate fibers, the illumination beam 638 can comprise several component beams, each emitted from one of the fibers of the output 634. In some embodiments, the illumination system input fibers 632$_1$, 632$_2$, 632$_3$, 632$_4$ and component fibers of the illumination system output 634 can comprise opposing ends of contiguous single-mode optical fibers with no intervening optical elements. In other embodiments, the illumination system 630 can further comprise one or more additional optical elements, such as reflective, refractive, and/or diffractive optical elements disposed between the illumination system input fibers $632_1$, $632_2$, $632_3$, $632_4$ and the illumination system output 634 to affect the direction, intensity, collimation, or otherwise condition the illumination beam 638. An example illumination system 630 compatible with certain embodiments described herein is described in greater detail with reference to FIG. 8.

When the illumination beam 638 reaches the surface 607 of the target object 605, at least a portion of the light in the illumination beam 638 is reflected and/or scattered from the surface 607. At least a portion of the reflected and/or scattered light travels as a target beam 639 to the optical imaging system 640 and the image recording system 650. The optical imaging system 640 comprises one or more optical elements configured to focus and direct the target beam 639 to the image recording system 650. In the example embodiment of FIG. 6, the optical elements of the optical imaging system 640 include a pupil 642 and a lens 644. The pupil 642 comprises a physical aperture, such as a square, rectangular, or circular aperture. The pupil 642 blocks a portion of the target beam 630, while allowing a selected portion of the target beam 630 to pass through to the lens 644 as a limited target beam 645. The limited target beam 645 passes through the lens 644 to become an imaging beam 645'. The imaging beam 645' is focused at an imaging plane, which coincides with an imaging sensor 652 of the image recording system 650. The reference beams $625_1$, $625_2$, $625_3$, $625_4$ also pass through the lens 644 and are directed as refracted reference beams $625_1'$, $625_2'$, $625_3'$, $625_4'$. The refracted reference beams $625_1'$, $625_2'$, $625_3'$, $625_4'$ are also incident on the image plane, such that the refracted reference beams $625_1'$, $625_2'$, $625_3'$, $625_4'$ interfere with the imaging beam 645' to form spatial interference patterns on the imaging sensor 652.

The image recording system 650 can comprise the imaging sensor 652 and one or more computing devices 654, e.g., a processor 656 and a memory 658 as schematically illustrated in FIG. 6. The imaging sensor 652 can comprise a charge-coupled device (CCD), complementary metal-oxide-semiconductor (CMOS) sensor, N-type metal-oxide semiconductor (NMOS) sensor, or the like. The memory 658 is configured to store images obtained at the imaging sensor 652. The processor 656 is configured to perform image processing operations such as generating one or more 3D images based on the images obtained at the imaging sensor 652.

Figure 7:
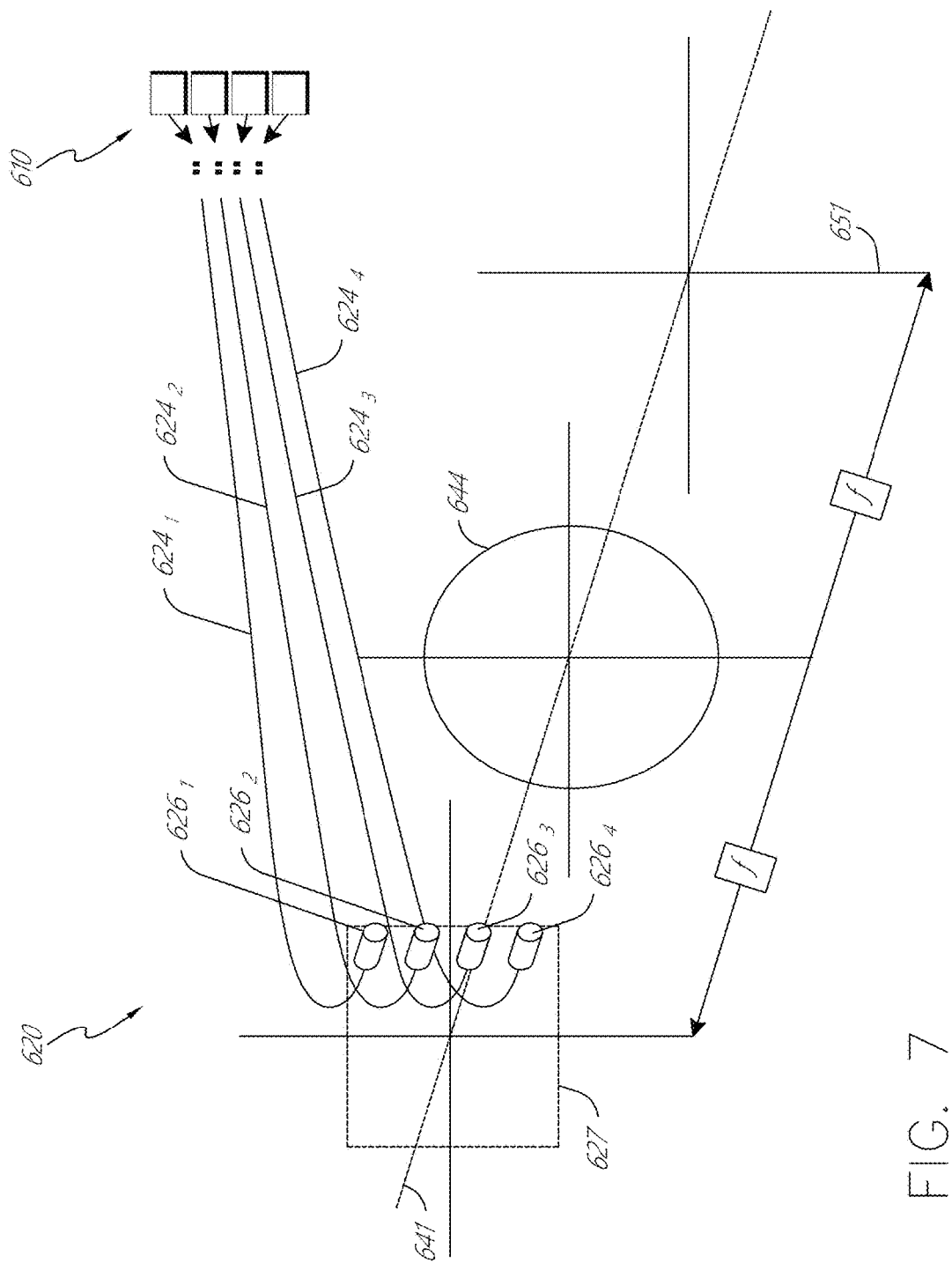
FIG. 7 depicts an example configuration of a reference system of the system of FIG. 6.

FIG. 7 depicts an example reference system 620 and optical imaging system 640 in accordance with certain embodiments described herein. As described above with reference to FIG. 6, the reference system 620 can comprise reference system output fibers $624_1$, $624_2$, $624_3$, $624_4$ carrying corresponding reference portions of the light from the light system 610. The reference system output fibers $624_1$, $624_2$, $624_3$, $624_4$ direct the reference portions of the light to reference beam output structures $626_1$, $626_2$, $626_3$, $626_4$, which can comprise rigid components for securing the ends of the reference system output fibers $624_1$, $624_2$, $624_3$, $624_4$ so as to accurately determine the direction of the reference beams leaving the reference system 620. In the example reference system 620 of FIG. 7, the reference beams are emitted toward the lens 644 of the optical imaging system 640 depicted in FIG. 6. The reference beams are emitted parallel to and offset from an optical axis 641, which passes centrally through the pupil 642 and the lens 644 of the optical imaging system 640. In addition, the reference beams are emitted from a reference launch plane 627 that is nominally one focal length f from the plane of the lens 644.

At the reference launch plane 627, each of the reference beams leaves its corresponding reference system output fiber $624_1$, $624_2$, $624_3$, $624_4$ as a divergent beam. The lens focuses and collimates the reference beams such that each of the reference beams, upon exiting the lens 644, is a collimated beam propagating toward a central portion of the imaging plane 651 at an angle relative to the optical axis. The angle of each reference beam exiting the lens 644, relative to the optical axis 641, is generally dependent upon the focal length f of the lens 644 and the lateral displacement of the reference beam in the reference launch plane 627, relative to the optical axis 641.

Figure 8:
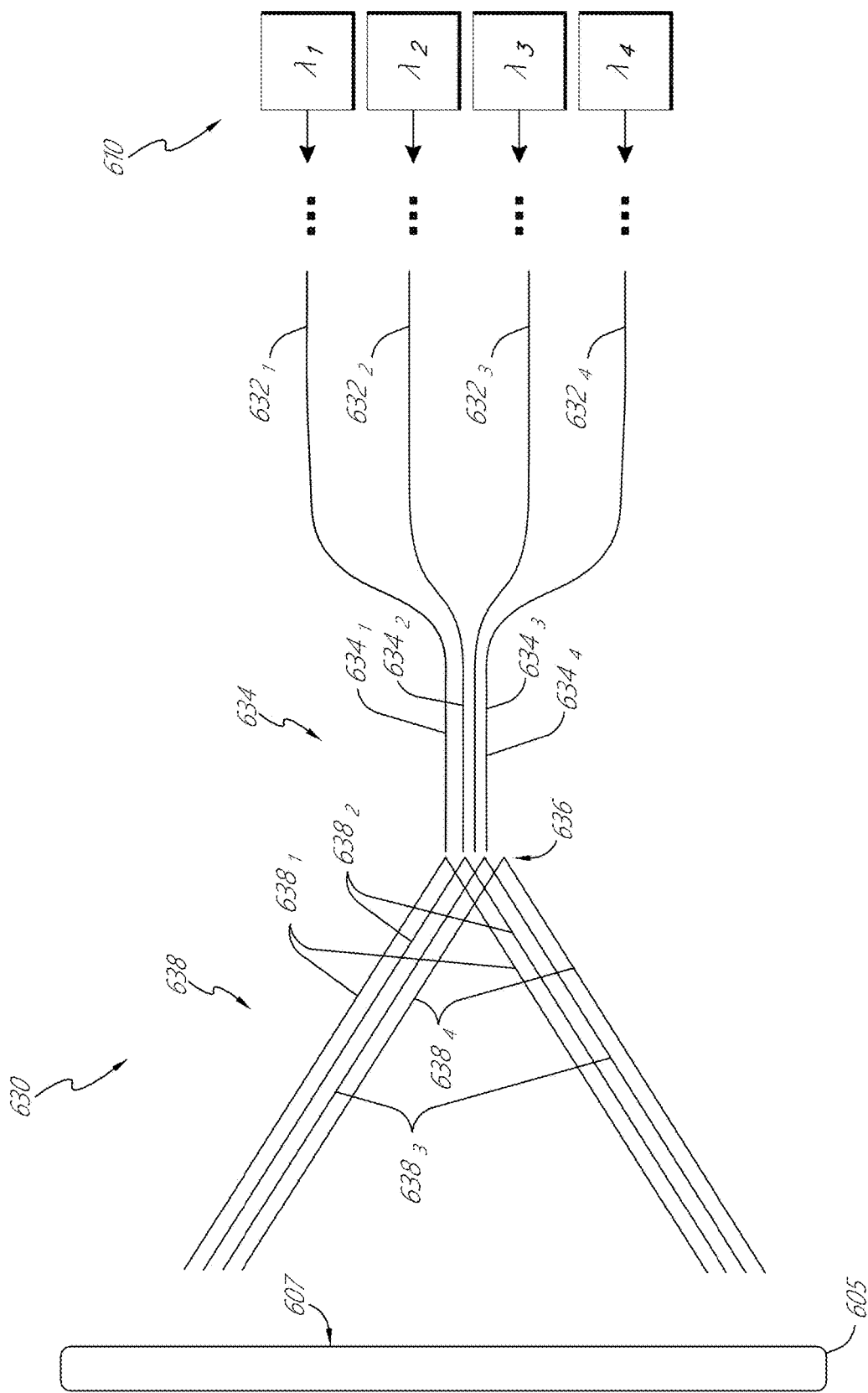
FIG. 8 depicts an example configuration of an illumination system of the system of FIG. 6.

FIG. 8 depicts an example illumination system 630 in accordance with certain embodiments described herein. As described above with regard to FIG. 6, the illumination system 630 can comprise illumination system input fibers $632_1$, $632_2$, $632_3$, $632_4$ and an illumination system output 634 carrying an illumination portion of the light from the light system 610. The illumination system output 634 can comprise individual illumination system output fibers $634_1$, $634_2$, $634_3$, $634_4$, which can be bundled together near the output end 636 so as to provide a substantially uniform distribution of the different wavelengths $\lambda_1$, $\lambda_2$, $\lambda_3$, $\lambda_4$ over a portion (e.g., an imaged portion) of the surface 607 of the target object 605 irradiated by the illumination portion of the light. As the individual wavelength components $638_1$, $638_2$, $638_3$, $638_4$ of the illumination beam 638 leave the output end 636, the light propagates over free space such that the individual wavelength components $638_1$, $638_2$, $638_3$, $638_4$ overlap to create the substantially uniform distribution. In some embodiments, the illumination system output fibers $634_1$, $634_2$, $634_3$, $634_4$ are bundled as close as possible to one another so as to approximate a point source of all of the wavelengths $\lambda_1$, $\lambda_2$, $\lambda_3$, $\lambda_4$.

Figure 9:
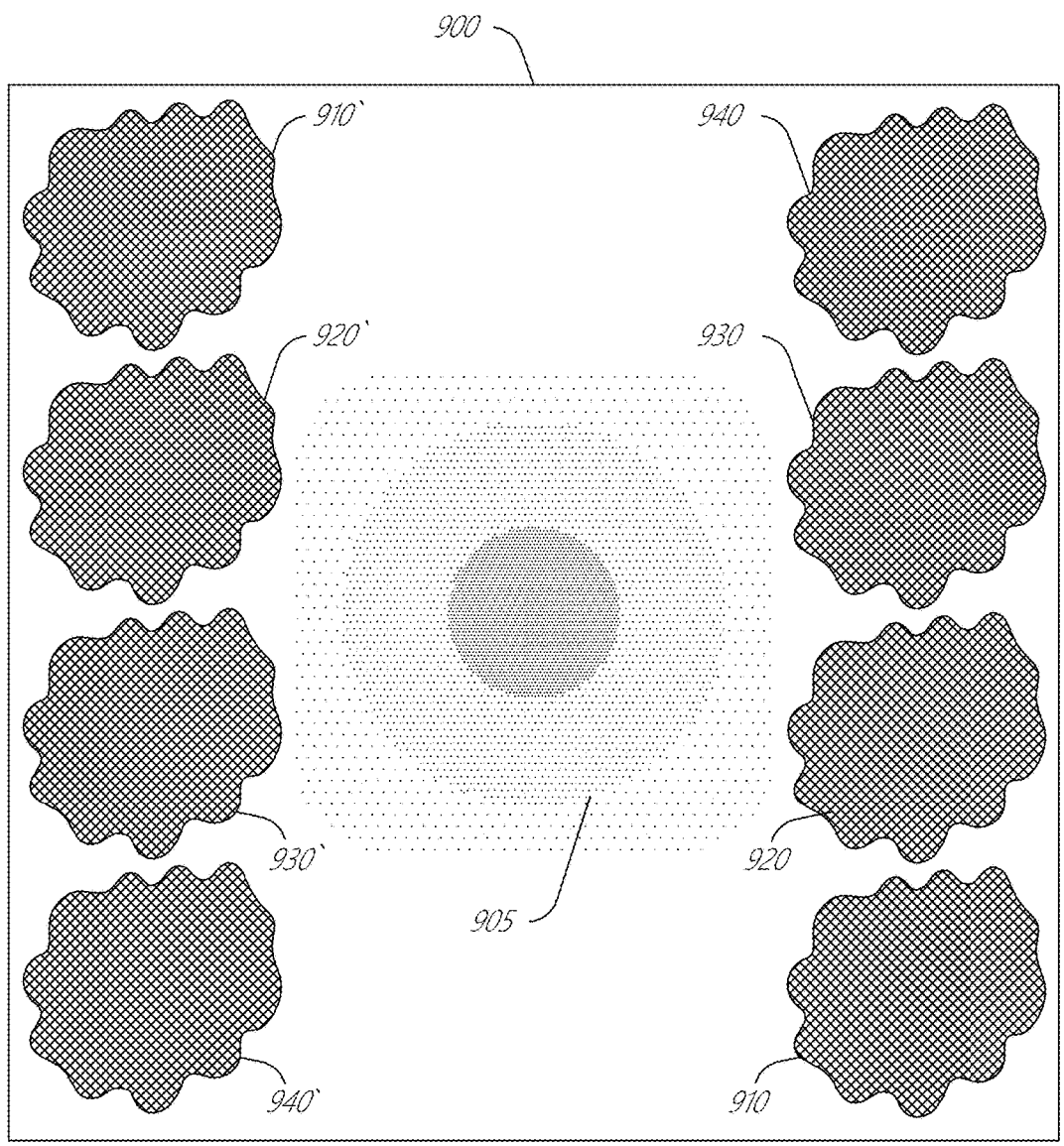
FIG. 9 depicts an example two-dimensional image in Fourier space including a main lobe and four side lobe pairs.

FIG. 9 depicts an example two-dimensional collective image 900, or an image comprising a plurality of component images, in Fourier space in accordance with certain embodiments described herein. The collective image 900 includes a main lobe 905 and four pairs of side lobes including side lobes 910, 910', side lobes 920, 920', side lobes 930, 930', and side lobes 940, 940'. The image 900 is consistent with the four-channel system 600 described with reference to FIGS. 6-8. Similar to the two-dimensional image 300 of FIG. 3, each of the side lobes 910, 910', 920, 920', 930, 930', 940 and 940' comprise a complex image that includes both amplitude and phase information. The two side lobes of each side lobe pair are complex conjugates of one another and contain substantially the same phase information (e.g., side lobes 910 and 910' form a side lobe pair 910/910' and are complex conjugates of each other). Similarly, side lobes 920 and 920', side lobes 930 and 930', and side lobes 940 and 940' form the other three side lobe pairs, wherein the side lobes of each pair are complex conjugates of one another and contain substantially the same phase information. A collective image 900 generated by the four-channel system 600 can comprise four side-lobe pairs formed by the interference of the four homodyne reference beams $625_1'$, $625_2'$, $625_3'$, $625_4'$ with the imaging beam 645'.

The location and spacing of the side lobe pairs 910/910', 920/920', 930/930', 940/940' can be dependent on the angle of each refracted reference beam $625_1'$, $625_2'$, $625_3'$, $625_4'$ relative to the imaging beam 645' as shown in FIG. 6. The angle of each refracted reference beam $625_1'$, $625_2'$, $625_3'$, $625_4'$ relative to the imaging beam 645' may in turn be determined by the lens 644 based on location and spacing of the parallel reference beams $625_1'$, $625_2'$, $625_3'$, $625_4'$ relative to the limited target beam 645. Thus, the location of side lobes 910, 920, 930, and 940 spaced vertically along a side of the collective image 900 is consistent with the spacing of the four reference beam output structures 626₁, 626₂, 626₃, 626₄ relative to the optical axis 641 as shown in FIG. 7. Accordingly, the Fourier space collective image 900 corresponds to an image captured at the imaging sensor 652 of FIG. 6. Efficient packing of the side lobes within the collective image 900 can be achieved based on the sampling of the system 600. The sampling can be quantified as Q<4, where Q is defined by:

$$Q = \frac{f\#\lambda}{d_p} \quad (1)$$

where f# is the f-number of the imaging system 650, λ is the wavelength, and $d_p$ is the pixel pitch of the imaging sensor 652. Accordingly, the sampling can be determined such that the side lobes 910, 920, 930, and 940/do not overlap one another and side lobes 910', 920', 930', 940' do not overlap one another. In various embodiments, the side lobes in the collective image 900 may or may not be overlapping. In embodiments with overlapping side lobes, the sampling may have a different range of values, for example, Q may be less than 4.

Figure 10:
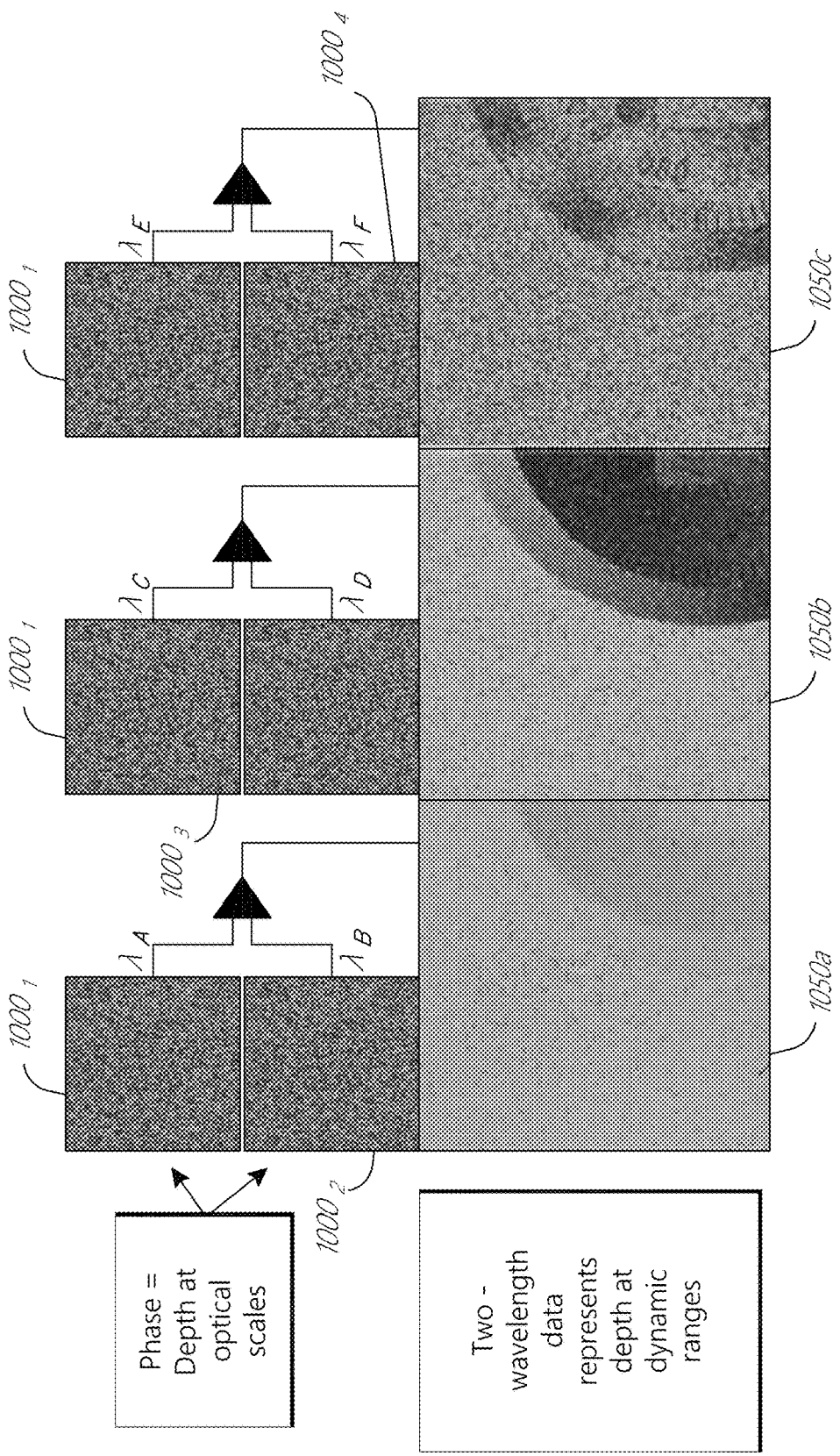
FIG. 10 depicts an example process of creating a high-dynamic-range image based on complex images obtained at a plurality of wavelengths.
Figure 11:
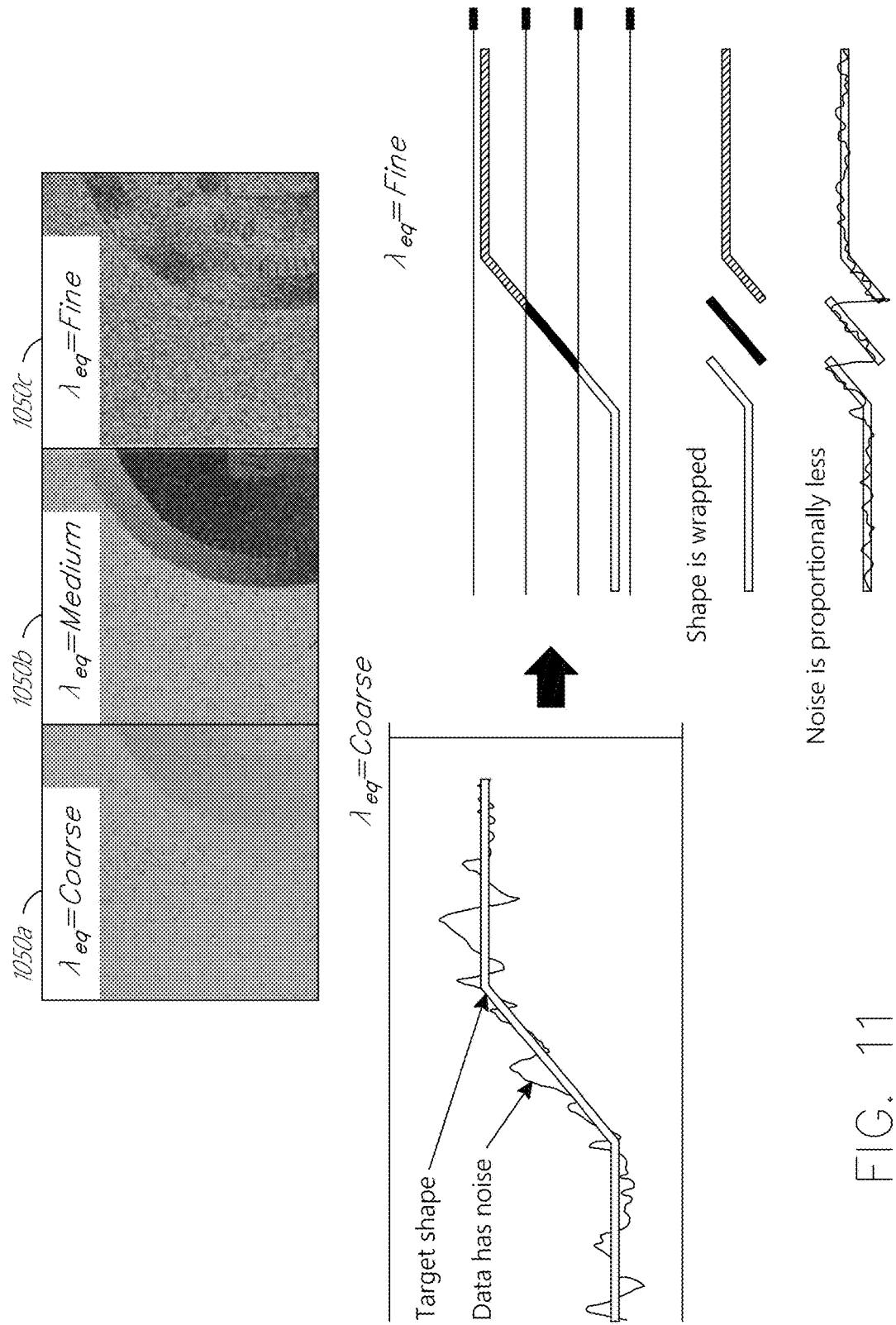
FIG. 11 depicts an example process of creating a high-dynamic-range image based on a plurality of complex images of an example object.

FIGS. 10 and 11 depict aspects of 3D imaging that may be achieved in accordance with certain embodiments of multi-channel holographic systems described herein. With reference to FIGS. 10 and 11, an example process of creating a high-dynamic-range image based on a plurality of complex images (e.g., the plurality of side lobes of a collective image) of an example object will be described. As described above, each side lobe of a collective image 900 comprises a complex image that includes phase information. The phase information is indicative of the surface profile of the target object 605. However, the phase information only provides an unambiguous surface profile within the range of the wavelength of the image. A multi-channel system 500, 600 as described herein may be implemented with lasers emitting visible or infrared wavelengths (e.g., in the range of 400 nm-700 nm). However, surface profile features of the target object 605 to be imaged may be in the range of millimeters, centimeters, or larger. In certain embodiments, phase information (and associated depth information) for larger length scales can be extracted from complex images having phase information at shorter wavelengths using a property of two-wavelength holography. When holographic images are created using two different wavelengths, $\lambda_1$ and $\lambda_2$, the resulting hologram appears as if it were created with an equivalent wavelength $\lambda_{eq}$, where $\lambda_{eq}$ is defined as:

$$\lambda_{eq} = \frac{\lambda_1 \cdot \lambda_2}{|\lambda_1 - \lambda_2|}. \quad (2)$$

In this manner, holographic images including phase information of large equivalent wavelengths (e.g., millimeters, centimeters, meters, kilometers, etc.), can be created by using two closely spaced wavelengths.

A 3D holographic image has components including 3D shape, 3D detail, and noise, and the noise and level of detail will scale with the equivalent wavelength $\lambda_{eq}$. The noise floor of a 3D holographic image can be equal to a fraction of $\lambda_{eq}$ (e.g., $\lambda_{eq}/n$), where n is dependent on factors such as (but not limited to): surface roughness, illumination wavelength, illumination power, integration time, camera noise, etc. Thus, the dynamic range of a 3D holographic system can be increased geometrically with additional laser wavelengths. For example, a large equivalent wavelength can provide information regarding the shape of the object, and medium to fine equivalent wavelengths can provide information regarding the detail of surface features of the object.

With reference to FIGS. 9 and 10, the complex side lobes 910, 920, 930, 940 of the collective image 900 can be extracted individually and an inverse Fourier transform operation can be applied to produce a complex image for each of the wavelengths imaged. The phase component 1000₁, 1000₂, 1000₃, 1000₄ of each complex image can then be used to generate phase information (e.g., holographic information) corresponding to longer equivalent wavelengths. The wavelengths of the individual laser sources 612₁, 612₂, 612₃, 612₄ can be selected such that various combinations of light from two of the laser sources 612₁, 612₂, 612₃, 612₄ result in the desired equivalent wavelengths. For example, as shown in FIG. 10, the wavelengths can be selected such that the equivalent wavelength of $\lambda_1$ and $\lambda_2$ is a coarse scale wavelength (e.g., on the order of cm), the equivalent wavelength of $\lambda_1$ and $\lambda_3$ is a medium scale wavelength (e.g., on the order of mm), and the equivalent wavelength of $\lambda_1$ and $\lambda_4$ is a fine scale wavelength (e.g., on the order of 0.1 mm or less). In this example, the wavelengths $\lambda_1$, $\lambda_2$, $\lambda_3$, and $\lambda_4$ may be in increasing or decreasing order, such that the difference between $\lambda_1$ and $\lambda_2$ is the smallest (and the corresponding equivalent wavelength is the largest), while the difference between $\lambda_3$ and $\lambda_4$ is the largest (and the corresponding equivalent wavelength is the smallest). Accordingly, the two-wavelength combinations of the wavelengths $\lambda_1$, $\lambda_2$, $\lambda_3$, and $\lambda_4$ can yield a coarse scale phase image component 1050a (resulting from the use of $\lambda_1$ and $\lambda_2$), a medium scale phase image component 1050b (resulting from the use of $\lambda_1$ and $\lambda_3$), and a fine scale phase image component 1050c (resulting from the use of $\lambda_1$ and $\lambda_4$). In certain other embodiments, other combinations of two wavelengths of the plurality of wavelengths can be used.

With reference to FIG. 11, the phase image components 1050a, 1050b, 1050c can then be unwrapped, for example, from longest equivalent wavelength image to shortest based on an algorithm in accordance with certain embodiments described herein, to reduce noise and produce high-dynamic-range depth information. Each of the phase image components 1050a, 1050b, 1050c has noise in the phase data. The fine scale phase image component 1050c may have an acceptably small amount of depth uncertainty due to noise, but is wrapped such that larger scale depth information may not be discernable. Conversely, the coarse scale phase image component 1050a may have a large enough depth scale to discern the overall shape of the object, but the depth uncertainty due to noise may be unacceptably large. The algorithm can start with the coarsest wavelength image, which is nominally unwrapped. The coarse scale depth information of the target object surface can then be used to unwrap the next coarsest $\lambda_{eq}$ image. Thus, each image is unwrapped using known depth information from a larger $\lambda_{eq}$ image until the finest scale is unwrapped. This algorithm can essentially force each $\lambda_{eq}$ image to agree with the next finest $\lambda_{eq}$ image such that the phase wrapping of the finest length scales is substantially mitigated.

Figure 12:
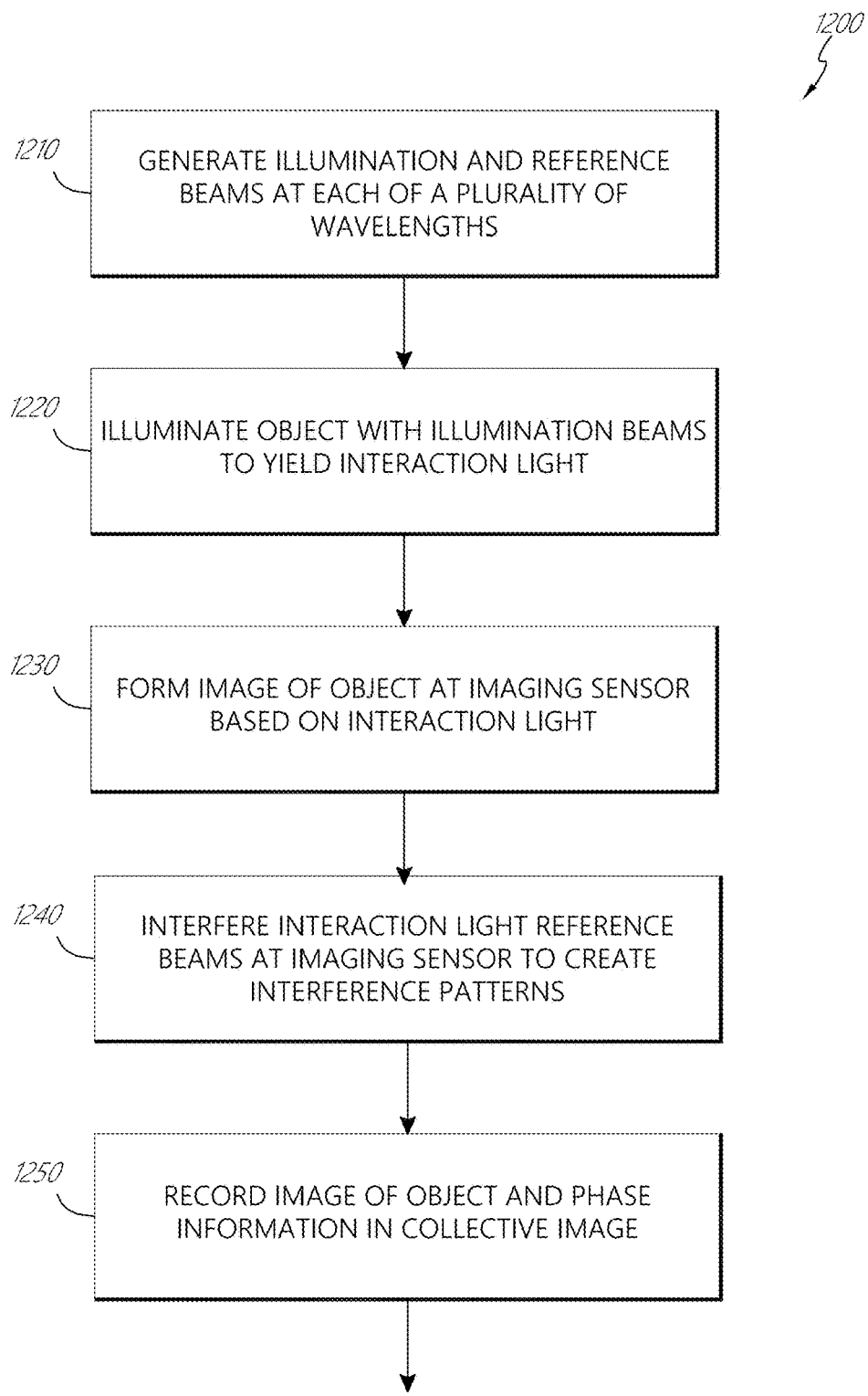
FIG. 12 is a flowchart depicting an example method of forming a collective image with a multi-channel system.

FIG. 12 is a flowchart depicting an example method 1200 of forming a collective image using a multi-channel system in accordance with certain embodiments described herein. The method 1200 can be implemented, for example, in a multi-channel imaging system such as systems 500 and 600 described above with reference to FIGS. 5-8. The method 1200 can produce a collective image comprising a main lobe and a plurality of side lobes, such as the image 900 described above with reference to FIG. 9.

The method 1200 comprises an operational block 1210, in which illumination and reference beams are generated at each of a plurality of wavelengths. In some embodiments, the illumination beam and the reference beam of each wavelength can be generated as a single beam of laser energy from a laser source and split with a beam splitter. In other embodiments, the illumination beam and the reference beam of each wavelength can be generated by separate sources configured to generate beams at the same wavelength. Preferably, light at different wavelengths is generated simultaneously with one another such that the imaging method described herein can be performed in a simultaneous "snapshot" format using all wavelengths at the same time, rather than separately imaging an object in each wavelength in a time-sequenced manner.

In an operational block 1220, a target object is illuminated with the illumination beams. The illumination beams can be at least partially contained within one or more optical fibers, such as single mode fibers. The fibers carrying the illumination beams can be drawn close together such that each of the illumination beams exits its corresponding optical fiber in close proximity and/or adjacent to the other illumination beams. As the illumination beams propagate through space to the surface of the target object, they can spread and overlap such that a portion of the surface of the target object is illuminated with a substantially uniform distribution of each of the wavelengths of the illumination beams. At least a portion of each of the illumination beams incident on the surface of the target object is reflected as interaction light. For example, interaction light can refer generally to some or all light from an active illumination source that has been reflected from the surface of an object. In some aspects, a coherent portion of an imaging beam can be reflected by surface features of the object as interaction light with phase differences dependent on the surface feature profiles. Phase differences within the interaction light can then yield depth information about the surface features when interfered with coherent reference light of the same wavelength.

In an operational block 1230, an image of the object is formed at an imaging sensor. The image can be formed based on receiving at least a portion of the interaction light at the imaging sensor. For example, a portion of the interaction light may propagate as a target beam and/or an imaging beam in the direction of the imaging sensor. Along the path from the target object to the imaging sensor, the interaction light may be conditioned, focused, or otherwise altered by one or more optical components of an optical imaging system such as the optical imaging systems 540, 640 described above with reference to FIGS. 5 and 6.

In an operational block 1240, the interaction light is interfered with the reference beams at the imaging sensor to create interference patterns. Because the interaction light and the reference beams are coherent at the plane of the imaging sensor, each of the reference beams interferes with the portion of the interaction light having the same wavelength. Accordingly, an interference pattern is formed for each of the constituent wavelengths of the reference and illumination beams.

In an operational block 1250, the image of the object and the interference patterns are recorded in a collective image. The interference patterns can be recorded as intensity information at the imaging sensor, and can be Fourier transformed to yield holographic information indicative of a depth or surface profile of the surface of the target object. The Fourier space representation of the object image may appear as a main lobe and the interference patterns may appear as a plurality of side lobes, as shown in FIG. 9. In some embodiments, the intensity information including interference patterns can be digitized, for example, before a Fourier transform is applied to extract holographic data. The collective image can be stored in memory in communication with the imaging sensor. In some embodiments, the collective image is further processed, for example, to produce one or more 3D images. Example processing methods are described below with reference to FIG. 13.

Figure 13:
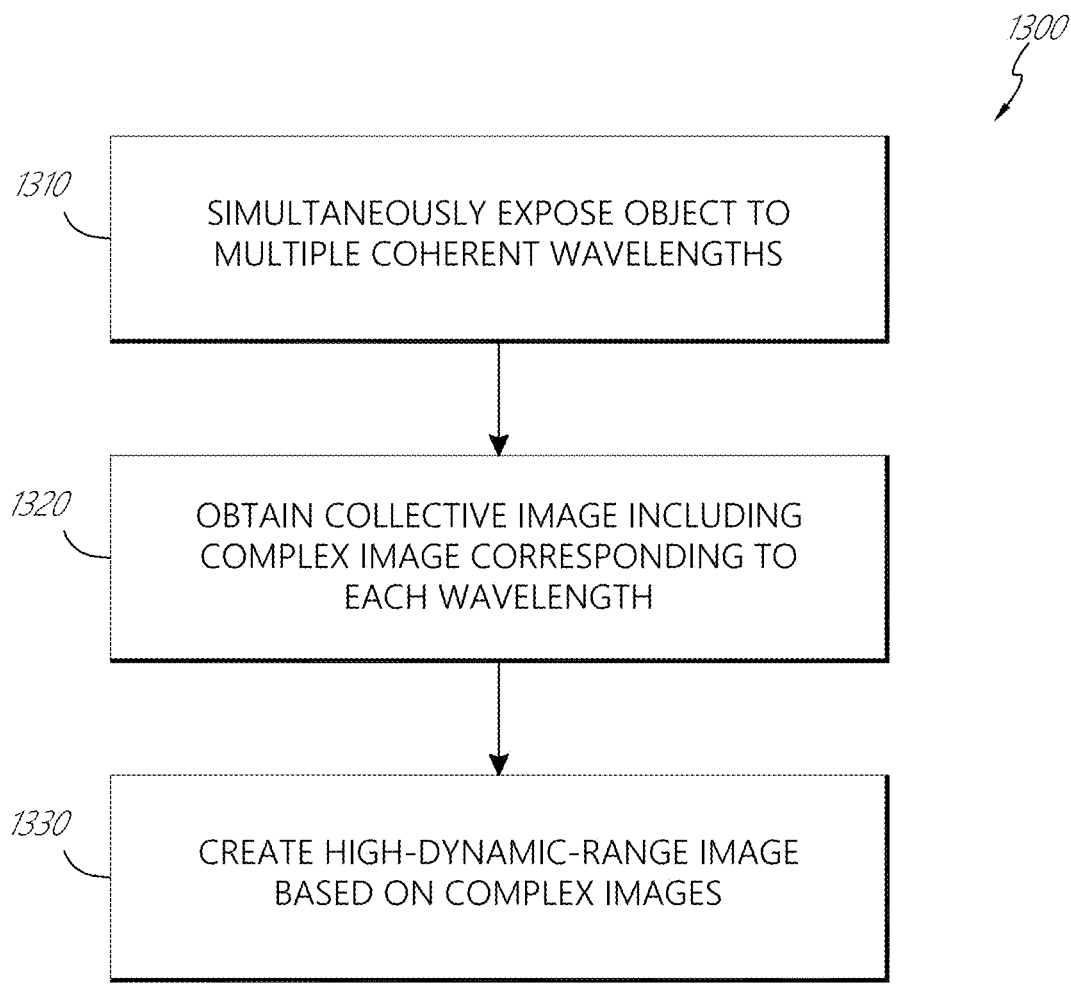
FIG. 13 is a flowchart depicting an example method of 3D high-dynamic-range imaging.

FIG. 13 is a flowchart illustrating an example method 1300 of 3D high-dynamic-range imaging in accordance with certain embodiments described herein. The method 1300 comprises an operational block 1310, in which an object is simultaneously exposed to multiple coherent wavelengths of light. The simultaneous exposure may include illumination with laser energy or other coherent light. For example, the object may be illuminated by illumination beams as described above with reference to FIGS. 5, 6, and 8. At least a portion of the light reflected by the object is received as an imaging beam at an imaging sensor of an image recording system, as described with reference to FIGS. 5 and 6.

In an operational block 1320, a collective image is obtained including a complex image corresponding to each wavelength. The collective image can be obtained by methods such as the method described above with reference to FIG. 12. The collective image is an image comprising a plurality of component images in image space and/or in Fourier space, some or all of which may be complex images. The complex images within the collective image may be side lobes in a Fourier-space collective image. Each complex image includes holographic information associated with differences in the distances from the light source traveled by the reference and imaging beams. The collective image can be stored in a memory in communication with an imaging sensor at which the collective image is captured.

In an operational block 1330, a high-dynamic-range 3D image is created based on the complex images. The high-dynamic-range image can be created by one or more processors and/or other computer components in communication with the memory in which the collective image is stored. Creation of the high-dynamic-range image in certain embodiments is done according to the various processing steps described above with reference to FIGS. 10 and 11, or through other processes. For example, in some embodiments, the phase information for various pairs of the recorded wavelengths are combined to produce phase information corresponding to an equivalent wavelength significantly longer than the two wavelengths used to produce the equivalent wavelength phase information. Phase information at several equivalent wavelengths may be combined to yield high-dynamic-range depth information which has a length scale consistent with the longest equivalent wavelength, while having a reduced dimensional uncertainty from noise (e.g., consistent with the shortest equivalent wavelength).

Although the foregoing systems and methods are described with reference to high-dynamic-range 3D imaging applications, it will be appreciated that they can equally be applied to other imaging applications. For example, a multi-channel system in which channels are orthogonally polarized may be used to produce an image having unique polarization in each side lobe, such that polarization effects of target surfaces can be studied. In addition, multiple polarization channels may be able to reduce observed speckle effects of existing holographic imaging systems. In addition, the 3D imaging techniques described herein may be combined with known synthetic aperture imaging techniques to achieve further enhanced signal to noise ratio.

In further example implementations, the multiple illumination and reference channels depicted in FIGS. 5 and 6 may be produced with differing temporal and/or spatial coherence characteristics to produce multiple side lobes of the same object with different temporal and/or spatial coherence information in each side lobe. Accordingly, optical coherence tomography collection can be enhanced using the multi-channel techniques described herein.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The foregoing description details certain embodiments of the systems, devices, and methods disclosed herein. It will be appreciated, however, that no matter how detailed the foregoing appears in text, the devices and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated. The scope of the disclosure should therefore be construed in accordance with the appended claims and any equivalents thereof.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

It is noted that the examples may be described as a process. Although the operations may be described as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc.

The previous description of the disclosed implementations is provided to enable any person skilled in the art to make or use the present disclosed process and system. Various modifications to these implementations will be readily apparent to those skilled in the art, and the generic principles defined herein may be applied to other implementations without departing from the spirit or scope of the disclosed process and system. Thus, the present disclosed process and system is not intended to be limited to the implementations shown herein but is to be accorded the widest scope consistent with the principles and novel features disclosed herein.

What is claimed is:

1. A method for forming a collective image, the method comprising:
    providing an illumination beam to an object to yield interaction light resulting from interaction between the illumination beam and the object, the illumination beam comprising coherent light at a plurality of wavelengths;
    directing at least some of the interaction light to an imaging sensor to form an image of the object on the imaging sensor; and
    interfering at least a portion of the interaction light with a plurality of reference beams simultaneously, thereby forming a plurality of interference patterns imaged on the image sensor;
    wherein each reference beam has a wavelength corresponding to one of the wavelengths;
    wherein the interference patterns combine with the image of the object at the imaging sensor to form the collective image having a Fourier transform that includes a plurality of side lobes in Fourier space, each side lobe corresponding to one of the reference beams and having holographic information about a range of the object's spatial frequencies.

2. The method of claim 1, wherein the Fourier transform of the collective image further comprises a main lobe located centrally within the Fourier transform of the collective image.

3. The method of claim 2, wherein each side lobe is non-overlapping with the main lobe, the other side lobes, and complex conjugates of each side lobe.

4. The method of claim 1, wherein the collective image comprises at least two side lobe pairs, each side lobe pair comprising a side lobe and a complex conjugate of the side lobe disposed opposite the side lobe about the center of the collective image.

5. The method of claim 1, wherein each reference beam interferes with at least a portion of the interaction light and does not interfere with the other reference beams.

6. The method of claim 1, wherein the illumination beam comprises a laser beam.

7. The method of claim 1, wherein each reference beam originates from a source that also generates a portion of the illumination beam.

8. The method of claim 1, wherein directing at least some of the interaction light to the imaging sensor comprises selectively blocking a portion of the interaction light at a pupil.

9. An imaging system comprising:
a light system having a plurality of light sources, each of the plurality of light sources configured to generate an illumination beam and a reference beam comprising coherent light of the same wavelength, and each of the plurality of light sources configured to generate the illumination and reference beams at a wavelength different than the wavelength of the other of the plurality of light sources;
an illumination system configured to receive the illumination beams from the light system and propagate the illumination beams from the light system to a light output device to illuminate an object with the illumination beams;
an optical system comprising a pupil, the optical system configured to receive a target beam of light reflected from the object and provide the target beam through the pupil to an optical imaging system;
a reference system configured to receive the reference beams from the light system and propagate the reference beams to the optical imaging system;
an optical imaging system configured to receive the reference beams from the optical system and the target beam and to combine the reference beams with the target beam to form a collective image representing the object, the collective image characterized as having a Fourier transform that includes a plurality of side lobes in Fourier space, each side lobe corresponding to one of the plurality of reference beams and having phase information about a range of the object's spatial frequencies; and
an image sensor configured to capture the collective image of the object.

10. The imaging system of claim 9, wherein the optical imaging system comprises at least one lens.

11. The imaging system of claim 10, wherein the reference system comprises one or more optical fibers configured to receive each reference beam and propagate each reference beam to the at least one lens along a path parallel to and displaced from the target beam.

12. The imaging system of claim 8, wherein the collective image is formed at an imaging plane, and wherein the image sensor is positioned at the imaging plane.

13. The imaging system of claim 11, wherein the location of each side lobe within the imaging plane is determined by the displacement of the corresponding reference beam relative to the target beam.

14. The imaging system of claim 9, wherein the imaging sensor comprises a charge-coupled device.

15. The imaging system of claim 9, further comprising a non-transitory computer readable medium configured to allow storage of the collective image.

16. The imaging system of claim 15, further comprising one or more processors in communication with the non-transitory computer readable medium, the one or more processors configured to create a 3D high-dynamic-range image based at least in part on the phase information in the plurality of side lobes.

17. A method of imaging, the method comprising:
exposing an object to a light source projecting coherent light at a plurality of wavelengths simultaneously;
obtaining a plurality of complex images of the object, each of the plurality of complex images including amplitude information and phase information, at least two of the plurality of complex images obtained based on light detected at different wavelengths, wherein the phase information of each complex image has a corresponding dynamic range related to the wavelength of the complex image;
obtaining phase information from at least two complex images of the plurality of complex images;
obtaining phase information corresponding to an equivalent wavelength in response to the phase information from the at least two complex images of the plurality of complex images, the phase information corresponding to the equivalent wavelength having a dynamic range that is greater than the dynamic ranges of the phase information of the at least two complex images; and
creating an image based at least in part on the phase information corresponding to the equivalent wavelength of the plurality of complex images.

18. The method of claim 17, wherein the creating comprises removing noise from the phase information corresponding to a first equivalent wavelength image associated with the plurality of complex images to produce a de-noised image, wherein the noise is removed from the phase information corresponding to the first equivalent wavelength image based at least in part on phase information corresponding to a second equivalent wavelength image associated with the plurality of complex images, wherein the second equivalent wavelength is shorter than the first equivalent wavelength.

19. The method of claim 17, wherein the creating comprises unwrapping the phase information corresponding to a second equivalent wavelength image associated with the plurality of complex images to produce an unwrapped image, wherein the phase information corresponding to the second equivalent wavelength image is unwrapped based at least in part on phase information corresponding to a first equivalent wavelength image associated with the plurality of complex images, wherein the second equivalent wavelength is shorter than the first equivalent wavelength.

20. The method of claim 17, wherein the plurality of complex images are obtained based on images captured simultaneously by an imaging sensor, each of the complex images comprising a side lobe in Fourier space.

21. The method of claim 20, wherein each of the side lobes is non-overlapping with side lobes of the other images within the collective image.

* * * * *